(12) United States Patent
Bird

(10) Patent No.: US 12,372,132 B2
(45) Date of Patent: Jul. 29, 2025

(54) ROTARY AND LINEAR ADJUSTABLE STIFFNESS MAGNETIC SPRINGS

(71) Applicant: Portland State University, Portland, OR (US)

(72) Inventor: Jonathan Bird, Portland, OR (US)

(73) Assignee: Portland State University, Portland, OR (US)

( * ) Notice: Subject to any disclaimer, the term of this patent is extended or adjusted under 35 U.S.C. 154(b) by 372 days.

(21) Appl. No.: 17/966,734

(22) Filed: Oct. 14, 2022

(65) Prior Publication Data
US 2023/0151868 A1      May 18, 2023

Related U.S. Application Data

(60) Provisional application No. 63/255,718, filed on Oct. 14, 2021.

(51) Int. Cl.
*F16F 6/00*      (2006.01)

(52) U.S. Cl.
CPC .......... *F16F 6/005* (2013.01); *F16F 2222/06* (2013.01); *F16F 2228/066* (2013.01)

(58) Field of Classification Search
CPC ... F16F 6/005; F16F 2222/06; F16F 2228/066
USPC .............................. 188/267, 267.1; 267/136
See application file for complete search history.

(56) References Cited

U.S. PATENT DOCUMENTS

| | | | | |
|---|---|---|---|---|
| 5,584,367 A | * | 12/1996 | Berdut .................... | B60L 13/10 104/294 |
| 7,884,518 B2 | * | 2/2011 | Blessing .............. | H02K 21/029 310/120 |
| 8,550,221 B2 | * | 10/2013 | Paulides .................. | F16F 6/00 267/136 |
| 9,016,446 B2 | * | 4/2015 | Mankame ................ | F16F 6/00 188/267 |
| 11,879,516 B2 | * | 1/2024 | Bird ........................ | F16F 6/005 |
| 2002/0003327 A1 | * | 1/2002 | Enoki ...................... | F16F 6/005 267/136 |

(Continued)

FOREIGN PATENT DOCUMENTS

| | | | | |
|---|---|---|---|---|
| JP | 2008196571 A | * | 8/2008 | ............. F16F 15/03 |
| JP | 2014095429 A | * | 5/2014 | ............... F16F 6/00 |
| WO | WO-2019201907 A1 | * | 10/2019 | ............. F16F 15/03 |

Primary Examiner — Christopher P Schwartz
(74) *Attorney, Agent, or Firm* — Klarquist Sparkman, LLP

(57) ABSTRACT

Various examples of a variable stiffness magnetic spring with a linear stroke length are provided. The stiffness of the magnetic springs is varied through rotation of one or more magnets, and both positive and negative spring constants are achievable. In one example, a variable stiffness magnetic spring includes a first magnetic component and a second magnetic component, wherein the first magnetic component is coaxial with the second magnetic component, the first magnetic component is rotatable about an axis and relative to the second magnetic component to adjust a stiffness of the variable stiffness magnetic spring, and the second magnetic component is translatable along the axis and relative to the first magnetic component. While such variable stiffness magnetic springs exhibit highly linear stroke lengths, such variable stiffness magnetic springs can be positioned in series to achieve an even longer linear stroke length.

18 Claims, 24 Drawing Sheets

(56) References Cited

U.S. PATENT DOCUMENTS

2006/0290219 A1\* 12/2006 Rodger ................. H02K 21/46
  310/156.36
2021/0054897 A1   2/2021 Bird \* cited by examiner

ROTARY AND LINEAR ADJUSTABLE STIFFNESS MAGNETIC SPRINGS

CROSS REFERENCE TO RELATED APPLICATION

This application claims the benefit of U.S. Provisional Patent Application No. 63/255,718, filed Oct. 14, 2021, which is hereby incorporated by reference.

ACKNOWLEDGMENT OF GOVERNMENT SUPPORT

This invention was made with government support under grant/award number DE-EE0008631 awarded by The United States Department of Energy. The government has certain rights in the invention. This research in funded in part by the Department of Energy's Office of Energy Efficiency and Renewable Energy (EERE) under the Water Power Technologies Office.

FIELD

This application relates to torsional magnetic springs, such as an adjustable stiffness torsional magnetic spring with a linear stroke length.

BACKGROUND

An adjustable stiffness magnetic spring is an enabling technology for use in ocean generators, robotic joints, energy scavenging generators, and active vibration isolators. Many ingenious mechanically adjustable spring structures have recently been investigated for robotic applications as well as energy harvesting devices. However, these structures appear to be highly complex, bulky, and potentially unreliable.

The non-contact operation of an adjustable-stiffness magnetic actuator, also referred to herein as a magnetic spring, has the potential of overcoming many of the limitations encountered with their mechanical counterparts. Adjustable-stiffness magnetic springs can be created by adjusting current excitation within a magnet device. However, this results in the need to continually use power to maintain a particular stiffness value. An adjustable-stiffness magnetic spring can also be created using an antagonistic north-south magnet arrangement, but using a direct magnet interface creates a highly non-linear stroke length.

SUMMARY

Adjustable stiffness magnetic springs are provided that exhibit a linear stroke length, where the stiffness is adjustable via rotation of the magnets. A mechanical brake is applied to the adjustable stiffness magnetic spring to prevent rotation and thus maintain a particular stiffness value. A relatively long linear stroke length may be obtained, and unlike in other variable stiffness designs, the magnet actuator does not need to be combined with a mechanical spring in order to create a negative stiffness.

The adjustable stiffness magnetic torsional springs provided herein may be used, as illustrative and non-limiting examples, in soft robotic joint applications and servo motor applications. The use of parallel or series variable stiffness springs in oscillatory tasks can reduce the peak power requirements of the drive motor and improve efficiency. Adjustable stiffness magnetic springs also have the potential for increasing the power generating capabilities of ocean generators. In many of the ocean generator designs, the stiffness needs to be negative.

Torsional magnetic springs can adjust their stiffness by axially moving the magnet rotors and locking the axial position in place. While the energy density of a magnetic spring is lower than its mechanical counterparts, the magnetic spring's non-contact operating capability enables it to have higher reliability and a longer service life. In addition, the magnetic operation of the spring enables the stiffness to be adjusted to have both a positive and a negative stiffness more easily than their mechanical spring counterparts. A magnetic spring also has low hysteresis loss.

All fixed stiffness and variable stiffness magnetic torsional springs published to-date have a non-linear stiffness which limits their stroke length range and prevents the spring from being used in series. Disclosed herein is a new type of adjustable stiffness torsional magnetic spring that exhibits a high degree of linearity. The adjustable stiffness magnetic spring may be implemented within an ocean generator in which a negative stiffness is needed for resonant mode generation. Along with experimental validation of the new variable stiffness magnetic spring, a series topology is provided to further increase the stroke length.

The foregoing and other objects, features, and advantages of the invention will become more apparent from the following detailed description, which proceeds with reference to the accompanying figures.

DETAILED DESCRIPTION

Figure 1:
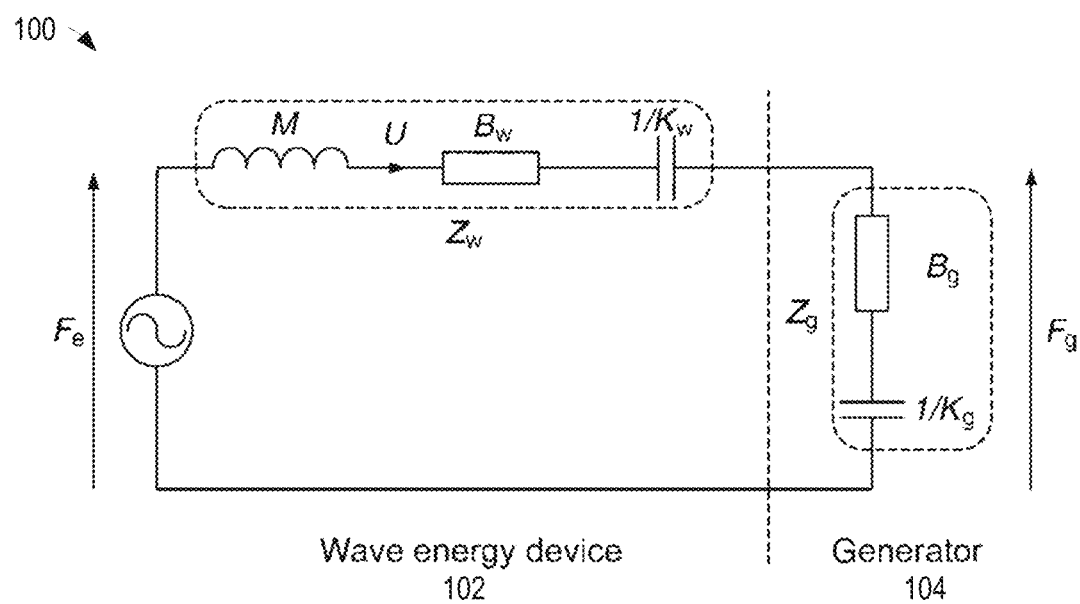
FIG. 1 shows a schematic diagram illustrating an example electrical analogy of a mass-spring-damper system in a wave energy conversion system.

Magnetic springs may be used in a wide variety of applications, including actuation of mechanical components (e.g., robotic actuators), wave energy conversion, microelectromechanical system (MEMS) energy harvesting, and/or other applications. As a representative example, the application of magnetic springs in wave energy conversion will be described below.

A Wave Energy Converter (WEC) is used to transform energy from waves into useable electricity. The WEC may include a primary converter and a Power Take-Off (PTO). The primary converter may include an enclosed chamber for an oscillating water column or a point absorber buoy that is positioned on or in a water body (e.g., the ocean), while the PTO is the mechanism with which the absorbed energy by the primary converter is transformed into the useable electricity. Hydraulic PTOs are commonly used in Wave Energy Converters (WECs) due to their very high force density, for instance hydraulic pistons can operate at a pressures of up to 38 MPa. However, hydraulic PTO generator systems are typically only efficient over a narrow operating region. In addition, the use of hydraulic fluid results in the need for regular maintenance and poses a serious leakage hazard. As an alternative, electromechanical generators with mechanical gearing are often considered. However, due to the mechanical contact between parts, electromechanical generators suffer from reliability issues and therefore their operational design life is limited, particularly if regular servicing is not undertaken.

To improve reliability, a large number of WECs are using direct-drive (DD) electromagnetic generators. As motion is entirely created from non-contact interaction, a DD generator can operate at a high efficiency. However, the force density of a DD generator is constrained by the current density (heat) and magnetic saturation and therefore the force density of a DD generator is not high relative to a hydraulic, electromechanical, or pneumatic PTOs. DD generators have been reported to have volumetric force densities in the range of 0.3 kN/L with air-gap magnetic shear stress values in the range of 0.053 MPa at rated value.

Recently, a new type of magnetic lead screw has been invented that can convert very low speed linear motion into high speed rotary motion. As the magnetic lead screw relies only on magnetic field interaction, and no current excitation, very high magnetic force densities can be achieved. For instance, in a magnetic shear stress value of 0.18 MPa was reported. However, as the magnetic lead screw's translator contains a large amount of magnet material, this makes it very costly for WEC use. If there was a way of creating the force without the translator being composed of magnets, then this could greatly improve the benefit of using the magnetic lead screw technology.

For rotary-based PTOs, rotary magnetic gearboxes are currently being studied as an alternative to their mechanical geared counterparts. A magnetic gear can create speed-change without any physical contact and therefore if magnetic gears with suitably high torque densities can be demonstrated then they could greatly increase the reliability of a WEC PTO.

Waves have a broad frequency band that experiences changes with time, season, and weather events. However, WECs may operate with a power response in a narrow frequency range, whereby the efficiency in absorbing wave energy peaks near the natural frequency, $\omega_o$. For example, a WEC and the PTO can be represented as a mass-spring-damper system, an electrical analogy of which is shown in FIG. 1 as system 100. The wave energy device 102 (e.g., the primary converter of the WEC) has an impedance, Zw, corresponding to a mass, M, damping, $B_w$, and spring constant, $K_w$, while the generator 104 has an impedance, $Z_g$, corresponding to a damping $B_g$ and spring constant $K_g$.

In order to be at resonance (e.g., to increase the overlap between the changing wave spectrum and the response of the converter), and therefore maximize power extraction, the PTO (generator) and WEC (wave energy device) damping term must be equal: $B_g(t)=B_w(t)$. If the damping is set too low, the oscillator (e.g., within the buoy or other moving element of the primary converter in the WEC) will move too much with regard to incoming waves and little power will be extracted. If the damping is set too high, the amplitude of motion will be limited, resulting in low power extraction. Further, the stiffness and mass must be related according to the forcing frequency by:

$$\omega_o(t) = \sqrt{\frac{K_w(t) + K_g(t)}{m}}.$$

As wave motion is slow the resonance frequency, $\omega_o$, is always small. Therefore, in order for the WEC to be at resonance either the mass, m, has to be very large or the total system spring constant term on the numerator of (1) must be small. If the PTO spring constant, $K_g(t)$, could actively be controlled to have a varying negative value then the PTO reactance could be made to match the WEC reactance and the WEC could then be made to operate continuously at resonance.

One approach to making the PTO operate with a negative spring constant is to use a DD generator with active current control. The DD generator will provide the generator forces that mimic a negative spring constant. The generators voltage and current are related to the WEC damping and stiffness terms respectively. Therefore, in order to provide both a sizable generator damping as well as negative stiffness, the generator voltage and current must be highly out of phase and thus an extremely large amount of reactive power must be created by the generator. This vastly increases the generator and power electronic converter cost.

Another option is to use a mechanical spring with a negative spring constant. For instance, a set of three symmetrically separated springs may be used to create an adjustable negative spring constant. Using this approach, with suitable controls, the power output can be increased by a factor of six relative to a detuned WEC. However, as the PTO in this example relies on a mechanical gear and pneumatics the long-term reliability of such a PTO will be questionable. In addition, the efficiency of pneumatic springs is not high.

In order to improve the reliability and efficiency of the PTO, a magnetic spring could potentially be used. However, the force between opposing magnets decreases rapidly with distance and therefore it has been difficult to determine a magnet arrangement that can create a linear spring constant. Generally in magnetic spring configurations, a central component (e.g., a central steel, steel/magnet, or magnet element) and outer components (e.g., left and right magnet elements with upward-directing and downward-directing polarity, respectively) are moveable relative to one another. However, due to the magnetic interaction of the elements, the spring force (e.g., the force urging the moving component back to a zero, or resting, position) changes based on the position of the elements relative to one another (e.g., the force generally becomes increasingly positive as displacement increases in a first direction and becomes increasingly negative as displacement increases in a second, opposite direction).

In other words, when moved away from a resting position (e.g., due to effects of wave movement), the spring exerts an opposing force based on the displacement. Due to the arrangement of components in such magnetic springs, the force-to-displacement relationship is non-linear. Linearity may be achieved close to the equilibrium (e.g., at the zero vertical position for the arrangement) but only for a small displacement.

As described above, a linear spring force-to-displacement relationship (e.g., linear spring constant) is ideal for maximizing efficiency of the spring. Additional spring characteristics that affect operation of the spring include maximum force exerted by the spring and stroke length (e.g., maximum displacement that the spring can experience).

The performance of negative magnetic springs has also been investigated, for instance, when using negative magnetic springs for structural vibration isolation. However, in such examples, the stiffness of the negative magnetic springs cannot be changed. In some systems, a rotary magnetic torsion spring can have an adjustable spring constant by axially shifting the rotors. However, in these systems the magnetic spring stiffness is not linear (e.g., there is not a linear force-to-displacement relationship for the spring). Thus, these configurations suffer from the same issues as the above-described arrangements.

Figure 2A:
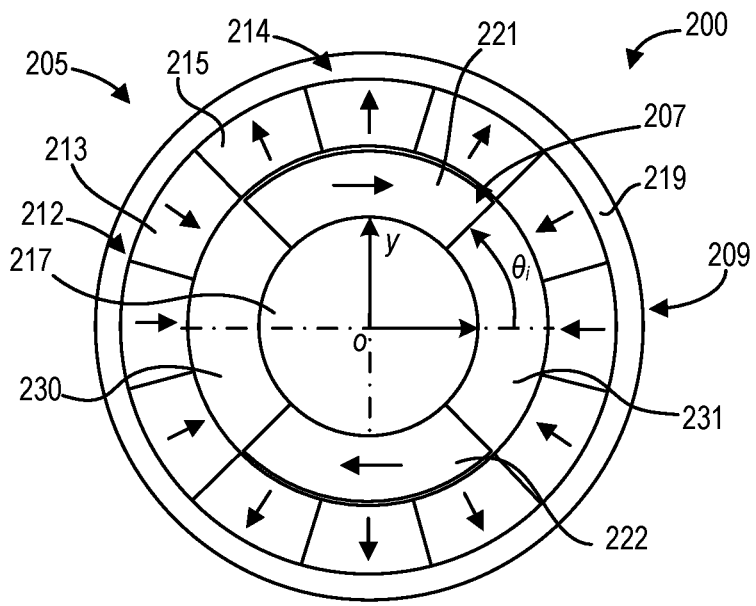
FIGS. 2A and 2B show a plan view and a cut-through view of an example dual-airgap adjustable stiffness magnetic spring.
Figure 2B:
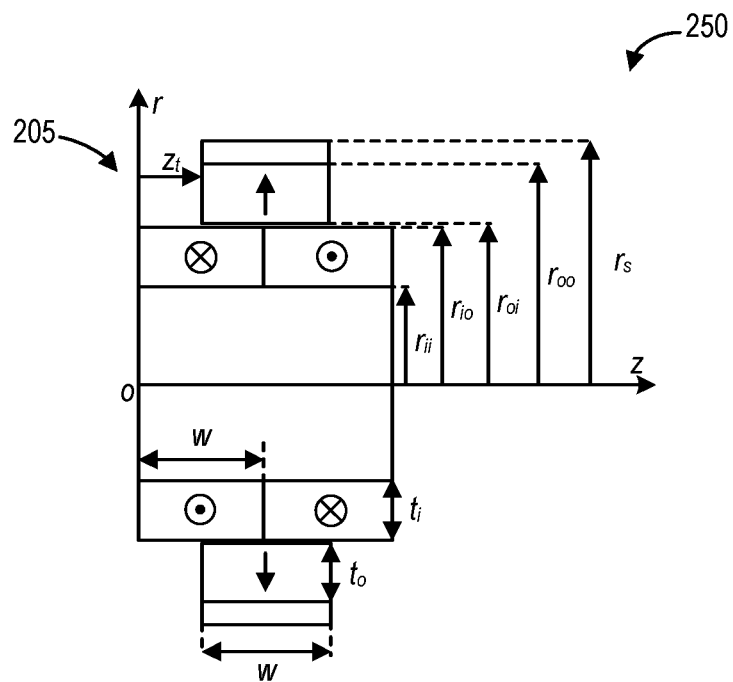

FIGS. 2A and 2B show diagrams illustrating a front view 200 and a cut-through view 250, respectively, of an adjustable stiffness magnetic spring 205, according to one example. Specifically, the adjustable stiffness magnetic spring 205 comprises a dual airgap adjustable stiffness magnetic spring. The adjustable stiffness magnetic spring 205 includes an inner rotor 207 comprising four magnets, including magnets 221 and 222, fixed to an inner rotor core 217. The adjustable stiffness magnetic spring 205 further includes an outer rotor 209 comprising a first plurality of magnets 212 and a second plurality of magnets 214 distributed around an interior of a cylindrical outer rotor support 219. The polarization of the first plurality of magnets 212 and the second plurality of magnets 213 may be opposite from each other, as depicted. For example, the polarity of the magnet 213 of the first plurality of magnets 212 is directed towards the inner rotor 207 while the polarity of the magnet 215 of the second plurality of magnets 214 is directed away from the inner rotor 207. Further, the polarity of the magnets of the inner rotor 207 are generally orthogonal to the polarity of the magnets of the outer rotor 209, and the magnets of the inner rotor 209 may be paired with opposing polarity as depicted in FIG. 2B. The configuration of the magnets of the inner rotor 209 forms two airgaps 230 and 231.

The inner rotor 207 is held fixed in place and the outer rotor 209 is allowed to rotate. FIG. 2A shows the outer rotor position at the peak (unstable) positive stiffness torque position. The stiffness value is adjusted by axially translating the outer rotor 209. Alternatively, the stiffness value may be adjusted by axially translating the inner rotor 207. FIG. 2B shows the axial position at the zero torque, zero stiffness position, at which the spring acts like a clutch. The outer rotor support 219 is made of ferromagnetic steel (e.g., 1018 steel). The inner rotor core 217 may comprise aluminum (e.g., 6061 aluminum).

Figure 3A:
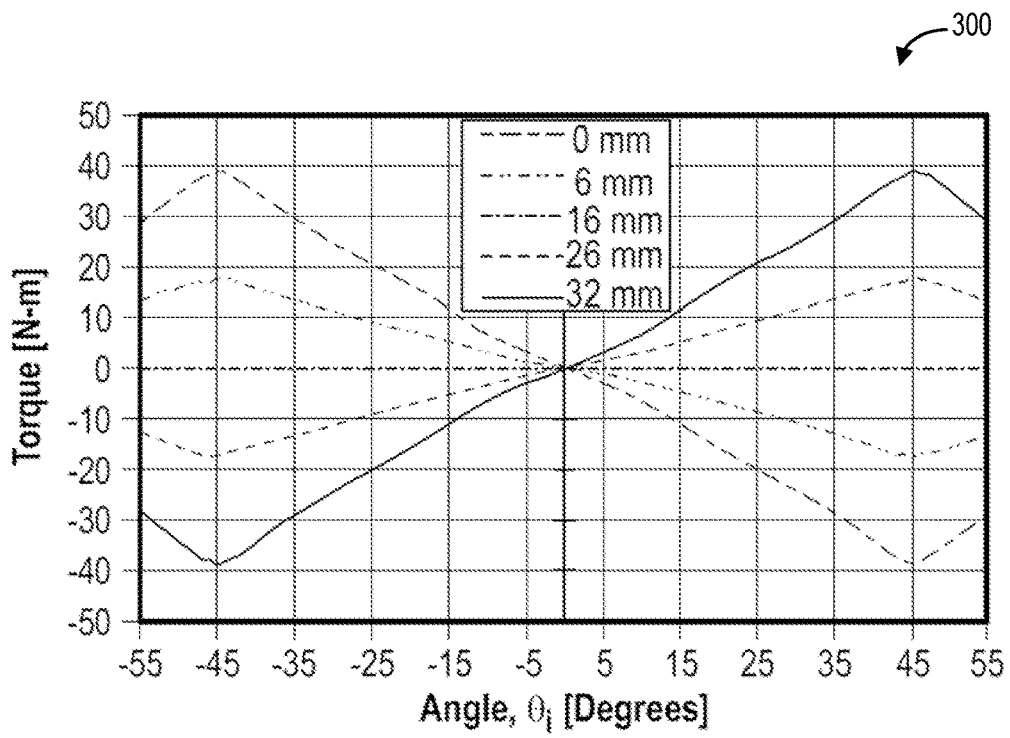
FIGS. 3A and 3B show graphs illustrating example calculations of torque as a function of angle and axial position for a dual-airgap adjustable stiffness magnetic spring.
Figure 3B:
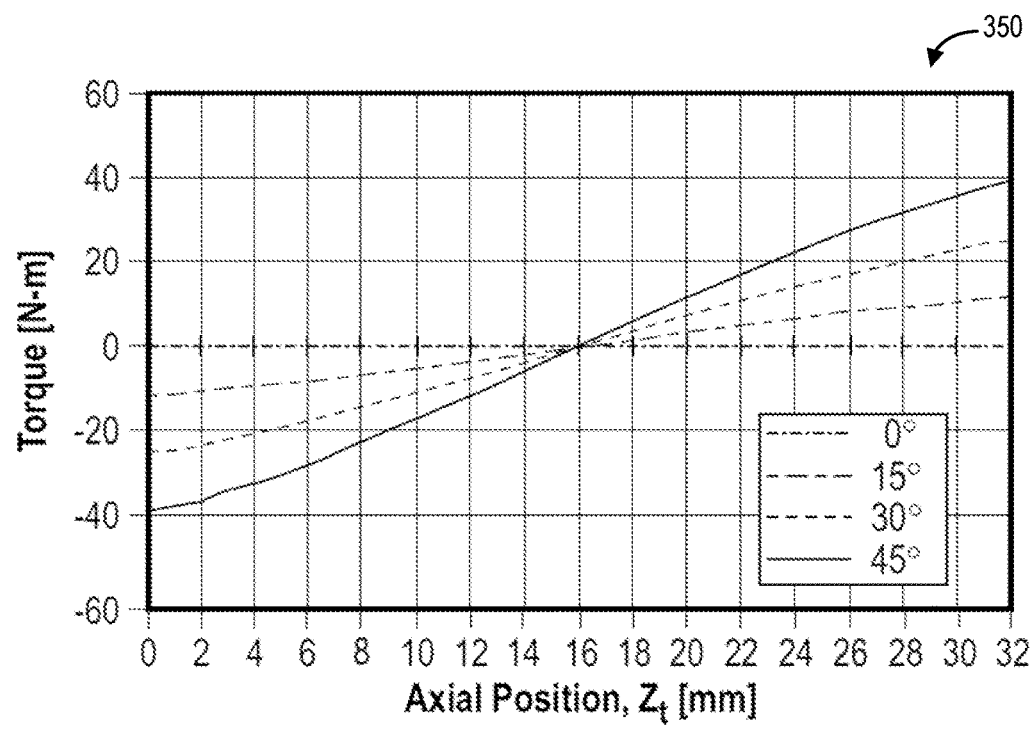

FIGS. 3A and 3B show graphs 300 and 350 illustrating torque as a function of stroke length and angular position. Using the initial design geometric parameters shown in Table I and N-50 grade magnets, the torque vs. stroke length relationship depicted was computed using three-dimensional finite element analysis (FEA) for different axial offset positions. The linearity is clearly apparent, as depicted in the graphs 300 and 350.

TABLE I

Geometric Values

| Parameter | | Value [mm] |
|---|---|---|
| Inner rotor | Inner radius $r_{ii}$ | 25 |
| | Outer radius $r_{io}$ | 40 |
| | Magnet thickness $t_i$ | 15 |
| | Magnet width w | 32 |
| Outer radius | Inner radius $r_{oi}$ | 41 |
| | Outer radius $r_{oo}$ | 56 |
| | Magnet thickness $t_o$ | 15 |
| | Magnet width w | 32 |
| Outer back steel radius $r_s$ | | 62 |
| Airgap g | | 1 |

The proof-of-principle prototype dimensions, shown in Table I, were selected based on the requirement to build a small prototype for demonstration purposes, and it should be appreciated that the dimensions are therefore illustrative and non-limiting. For example, Table II shows other example dimensions for an improved design over the initial design, as well as example dimensions for a peak energy density design.

TABLE II

Geometric Parameters

| Parameter | Proof of Principle Design | | Peak Energy Density Design [mm] |
|---|---|---|---|
| | Initial Design [mm] | Improved Design [mm] | |
| Airgap radius $r_g$ | 40.5 | 30.5 | 40.5 |
| Airgap g | 1 | 1 | 1 |
| Inner magnet thickness $t_i$ | 15 | 11 | 15 |
| Outer magnet thickness $t_o$ | 15 | 10 | 10 |
| Magnet width w | 32 | 45.75 | 60.75 |
| Outer back steel radius $r_s$ | 62 | 47 | 57 |

By translating the outer rotor, it is shown that at a given angle both negative and positive stiffness can be equally obtained. The peak torque value, which occurs at $\theta_i=45°$, was computed to be $T_m=39.1$ N·m. At $z_t=16$ mm, the outer rotor is between the two inner rotors, as illustrated in FIG. 2B, and this results in zero torque. The coefficient of determination, denoted as $r^2$, can be used to evaluate the level of linearity of the torque. When $r^2=1$, a line is completely linear; in the design shown in FIG. 3A, the linearity was computed to be $r^2=0.998$.

The torque can be accurately described by $$T_z(\theta_i, z_t) = -[k_m \cos(\lambda z_t)]\theta_i$$

where $$\lambda = \frac{\pi}{z_m},$$

$k_m=49.78$ Nm/rad is the peak stiffness, and $z_m=32$ mm is the maximum stroke length.

Figure 4A:
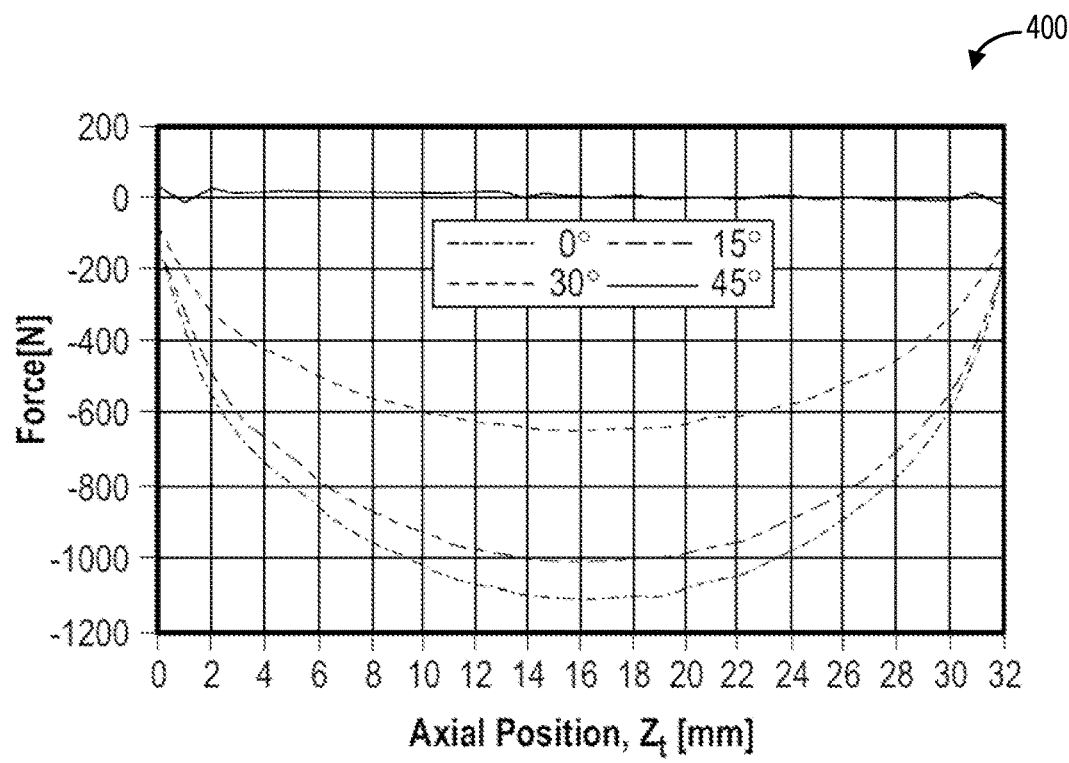
FIGS. 4A and 4B show graphs illustrating example calculations of force as a function of angle and axial position for a dual-airgap adjustable stiffness magnetic spring.
Figure 4B:
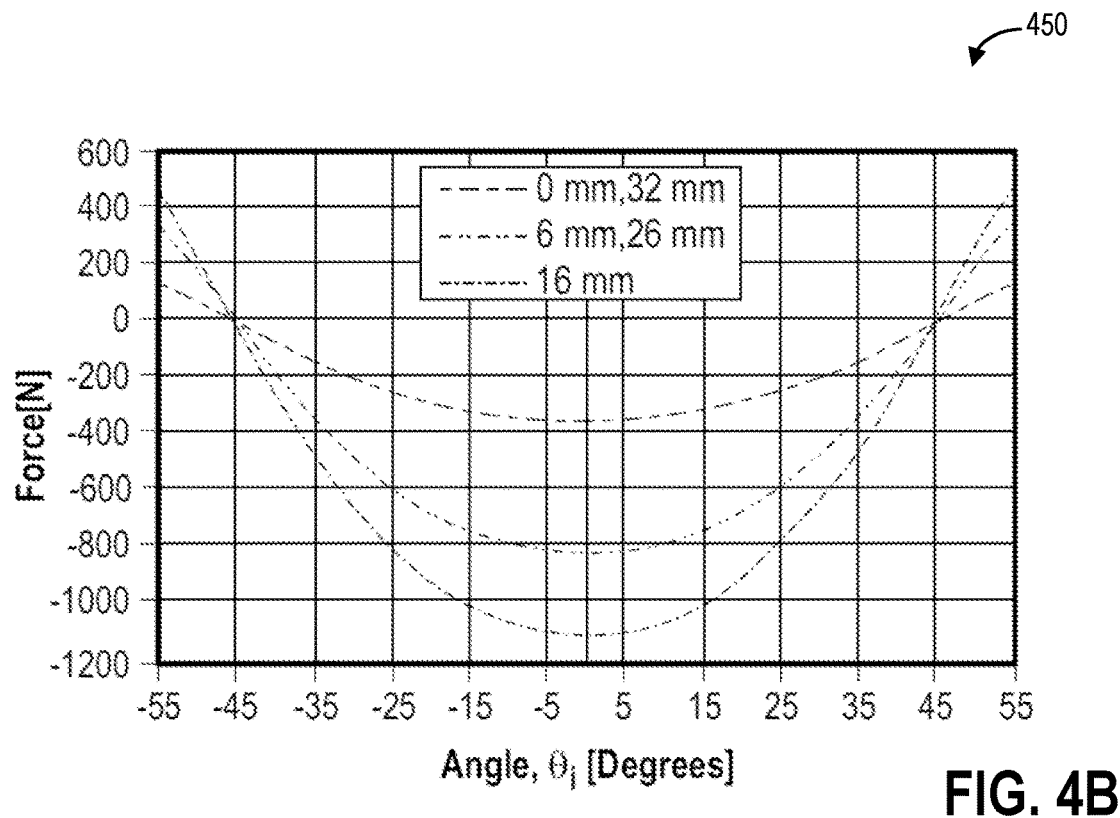

FIG. 4A and FIG. 4B show graphs 400 and 450, respectively, illustrating stiffness adjustment force as a function of axial position and angle. Interestingly, the adjustment force is zero at the peak torque angle, $\theta_i=45°$. This is because the spring must conserve the coupled magnetic energy. The magnetic interaction energy is shifted between the rotary and linear axis during the rotation and translation motion. The force required to adjust the stiffness is high, however the force only needs to be adjusted during stiffness change events and the axial position of the rotor is fixed in place using a mechanical brake. As the ocean wave period changes gradually, for example over the span of minutes, the stiffness adjustment power loss makes up a relatively small percentage of power generation capacity.

Figure 5:
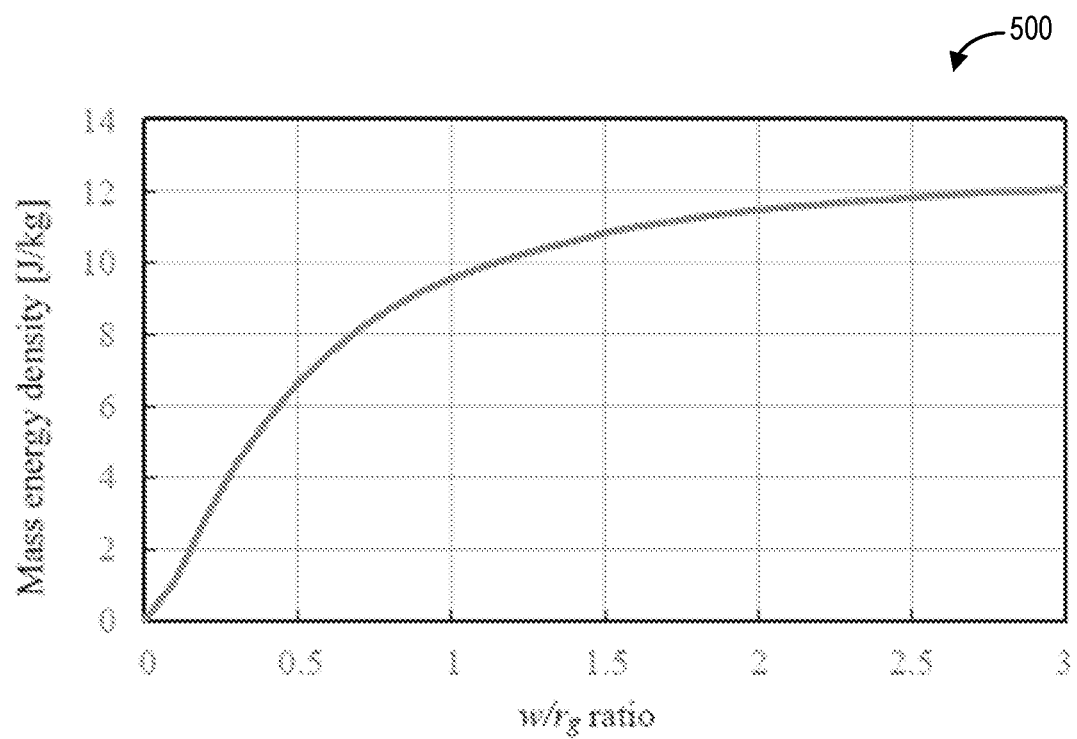
FIG. 5 shows a graph illustrating example calculations of mass torque density as a function of width-to-radius ratio for an example dual-airgap adjustable stiffness magnetic spring.

A sweep parameter analysis was used to improve the energy density of the magnetic spring design. The axial width of the magnetic spring can improve the energy density. FIG. 5 shows a graph 500 illustrating how the mass energy density changes with the width-radius ratio $w/r_g$. The width-radius ratio is defined as:

$$\Gamma = \frac{w}{r_g},$$

where $r_g$ is the airgap radius:

$$r_g = \frac{r_{io} + r_{oi}}{2}.$$

As depicted in the graph 500, the mass energy density increases as the axial width of the magnetic spring, and thus the width-radius ratio $\Gamma$, increases.

The energy density $E_d$ may be computed by using:

$$E_d = \frac{k_m \theta_i^2}{2} \cdot \frac{1}{\rho_d \pi w \left[(r_{oo}^2 - r_{oi}^2) + (r_{io}^2 - r_{ii}^2)\right]}$$

where $\theta_i=\pi/4$ is evaluated at the maximum torque angle. In the initial proof-of-principle design, the width-radius ratio $\Gamma=0.79$ was used. However, FIG. 5 shows that this results in the mass energy density being $E_d=8.39$ J/kg. By selecting a width-radius ratio of $\Gamma=1.5$, the mass energy density increases by 28.9% to $E_d=10.82$ J/kg. This is then 89.67% of the maximum possible value.

A further improvement in energy density can be obtained by sweeping the magnet thickness and airgap radius. The inner and outer magnet thickness is respectively defined as $$t_i = r_{io} - r_{ii}$$

$$t_o = r_{oo} - r_{oi}.$$

Figure 6A:
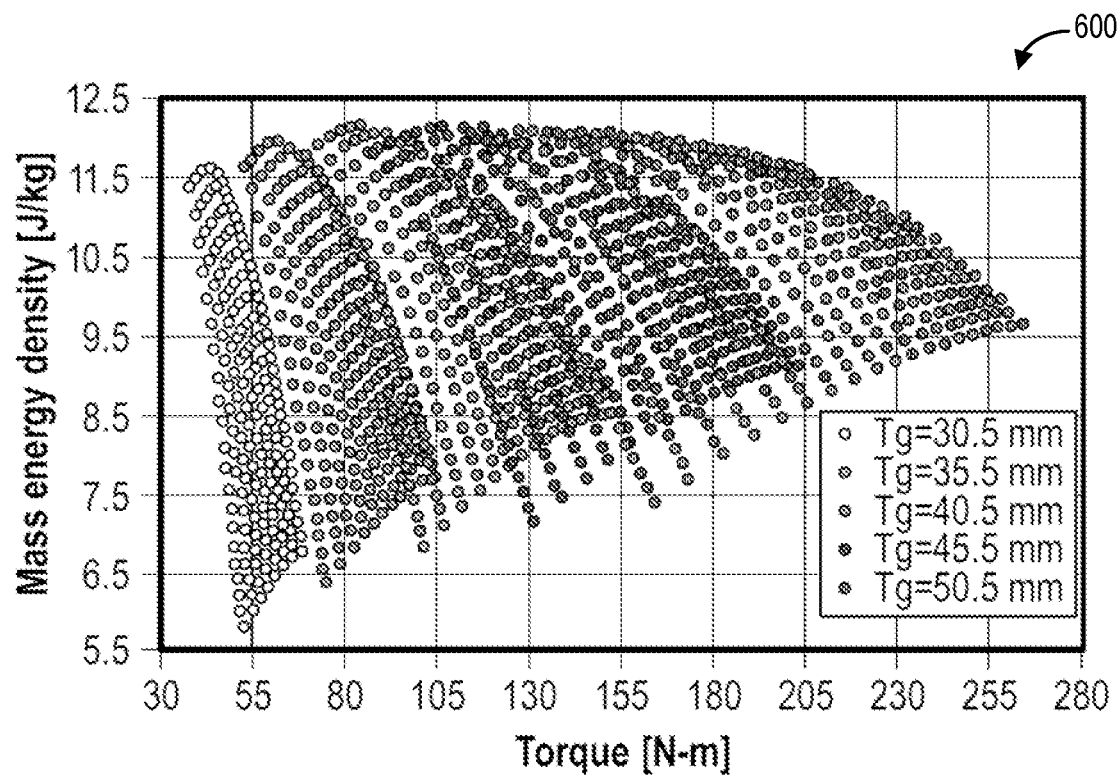
FIGS. 6A and 6B show graphs illustrating example calculations of mass energy density as a function of torque for a plurality of parameters for implementing a dual-airgap adjustable stiffness magnetic spring.
Figure 6B:
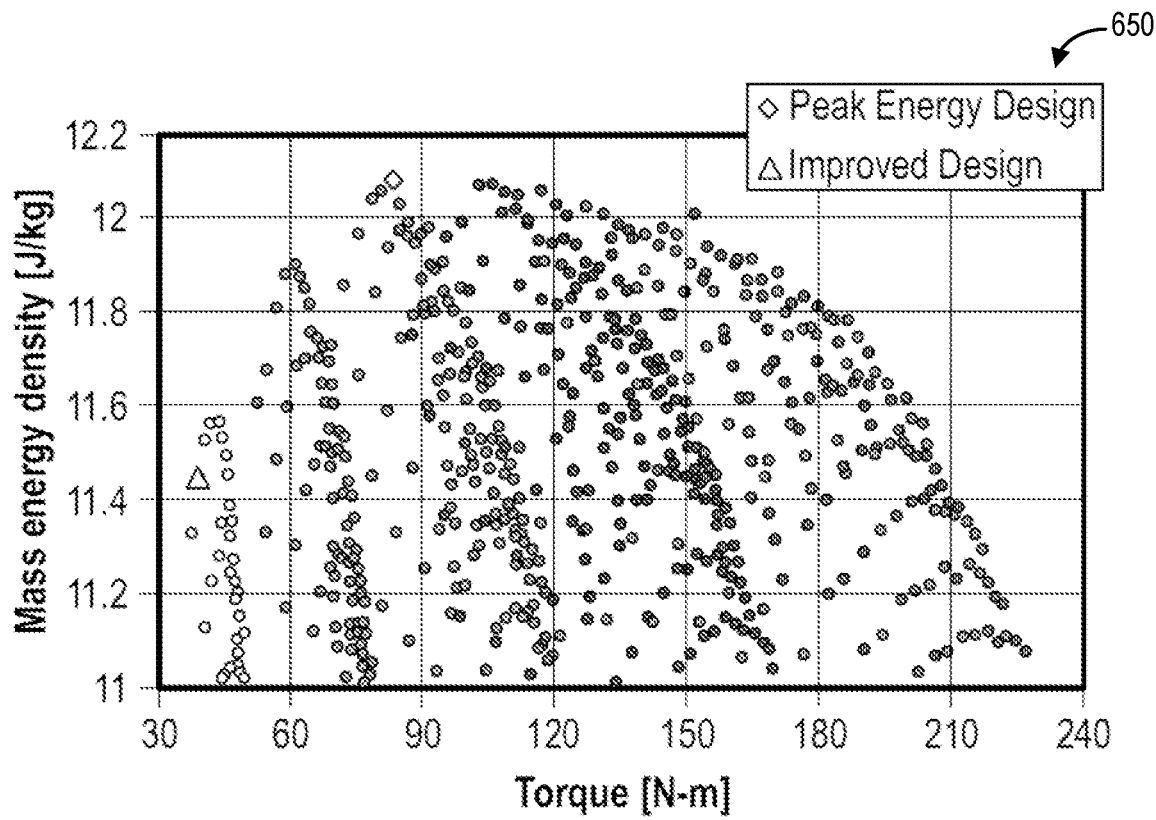
Figure 7A:
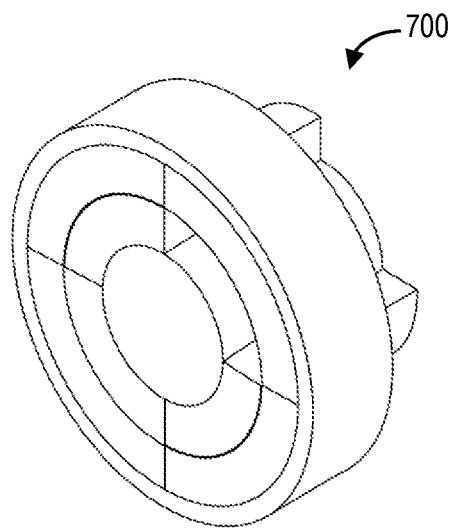
FIG. 7A shows a perspective view of an example dual-airgap adjustable stiffness magnetic spring with proof-of-principle parameters.
Figure 7B:
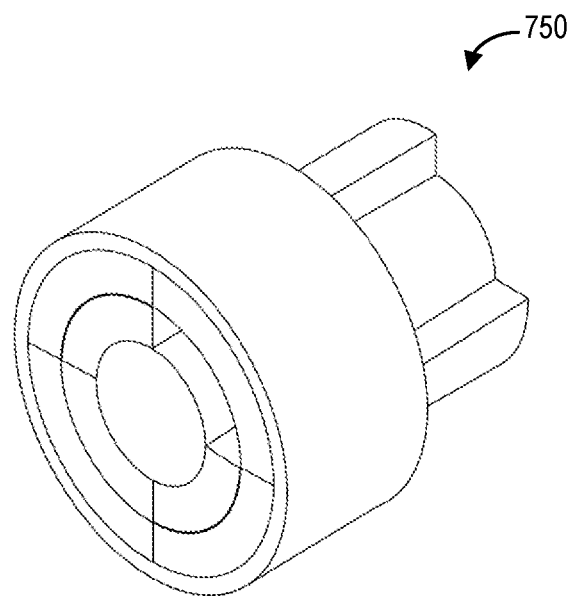
FIG. 7B shows a perspective view of an example dual-airgap adjustable stiffness magnetic spring with peak energy density parameters.

By using the parameters shown in Table II and keeping $\Gamma=1.5$, the sweep analysis results as shown in FIGS. 6A and 6B were obtained. FIG. 6A shows a graph 600 illustrating 3-D FEA calculated parameter sweep results for the mass torque density as a function of torque, while FIG. 6B shows a graph 650 illustrating a zoomed-in view of the sweep analysis results and indicating the values for the improved design and the peak energy design. FIG. 7A shows the proof-of-principle design 700 of the magnetic spring described herein while FIG. 7B shows the peak energy density geometry design 750 of the magnetic spring described herein. The design that has the maximum energy density, but higher peak torque, as well as an improved design that achieves the same peak torque as the initial design is shown in FIG. 6B. A summary of the geometry parameters and performance metrics for the three designs is shown in Table II and Table IV respectively.

TABLE III

Sweep Parameters

| Airgap radius $r_g$ | [30.5, 35.5, . . . , 50.5] mm |
|---|---|
| Inner magnet thickness $t_i$ | [10, 11, . . . , 30] mm |
| Outer magnet thickness $t_o$ | [10, 11, . . . , 30] mm |

TABLE IV

Performance Metrics

| Parameter | Proof of Principle Design | | Peak Energy Density Design | Units |
|---|---|---|---|---|
| | Initial Design | Improved Design | | |
| Peak torque | 39.1 | 39.6 | 83.55 | N · m |
| Spring rate | 49.8 | 50.42 | 106.38 | N · m/rad |
| Peak energy | 15.35 | 15.55 | 32.81 | J |

TABLE IV-continued

Performance Metrics

| | Proof of Principle Design | | Peak Energy | |
|---|---|---|---|---|
| Parameter | Initial Design | Improved Design | Density Design | Units |
| Active region mass | 1.8 | 1.36 | 2.71 | Kg |
| Energy density | 8.39 | 11.45 | 12.10 | J/kg |
| | 62.85 | 85.94 | 90.72 | kJ/m³ |

Figure 8A:
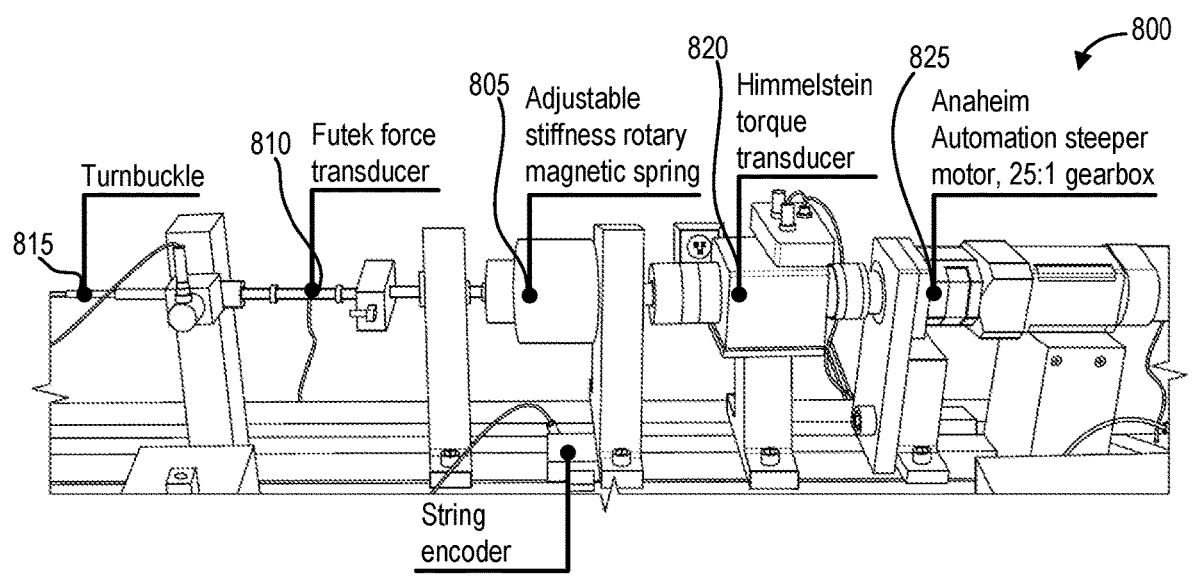
FIG. 8A shows an example system for evaluating an adjustable stiffness magnetic spring.
Figure 8B:
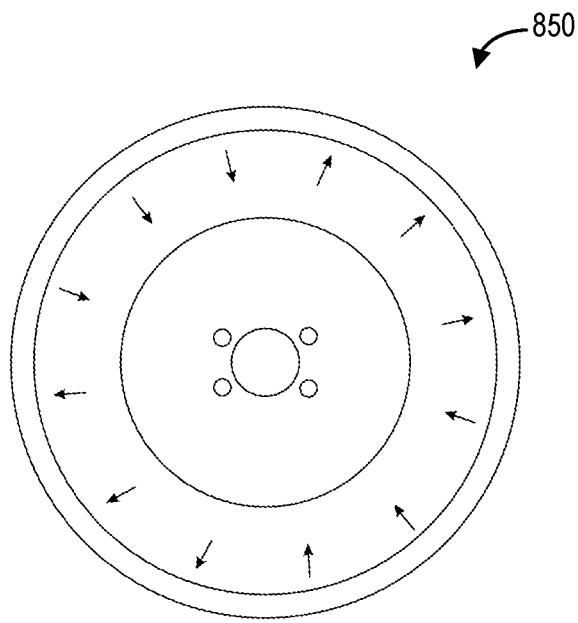
FIG. 8B shows an example assembled outer rotor of an adjustable stiffness magnetic spring.
Figure 8C:
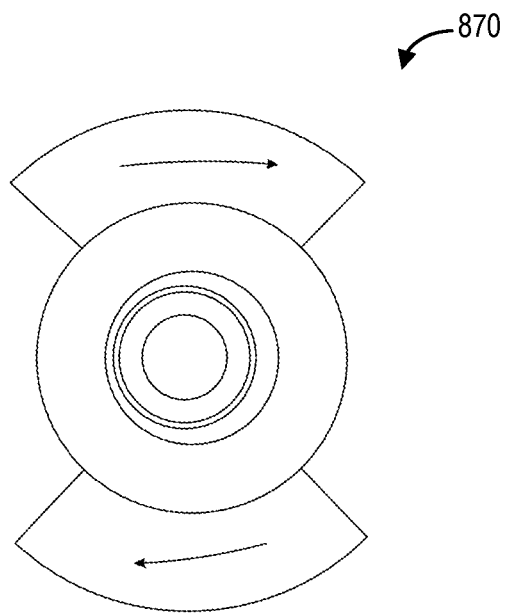
FIG. 8C shows an example assembled inner rotor of an adjustable stiffness magnetic spring.
Figure 9A:
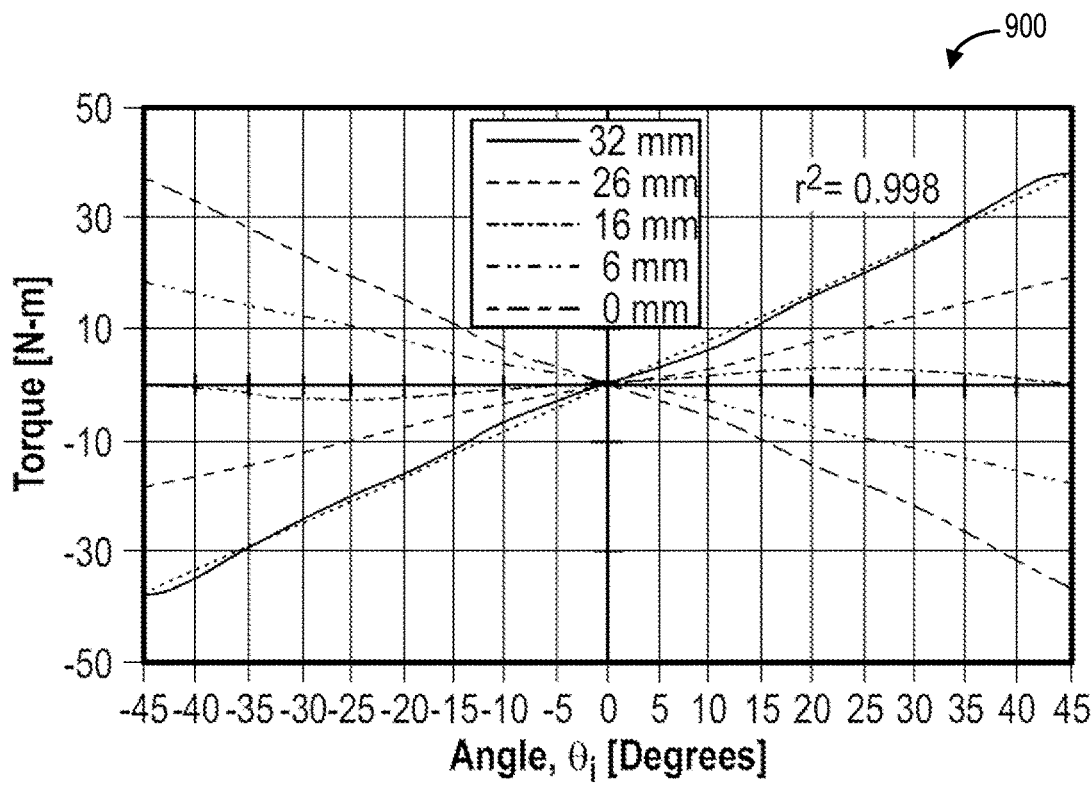
FIG. 9A shows a graph illustrating example measurements of torque as a function of angle for a dual-airgap adjustable stiffness magnetic spring.
Figure 9B:
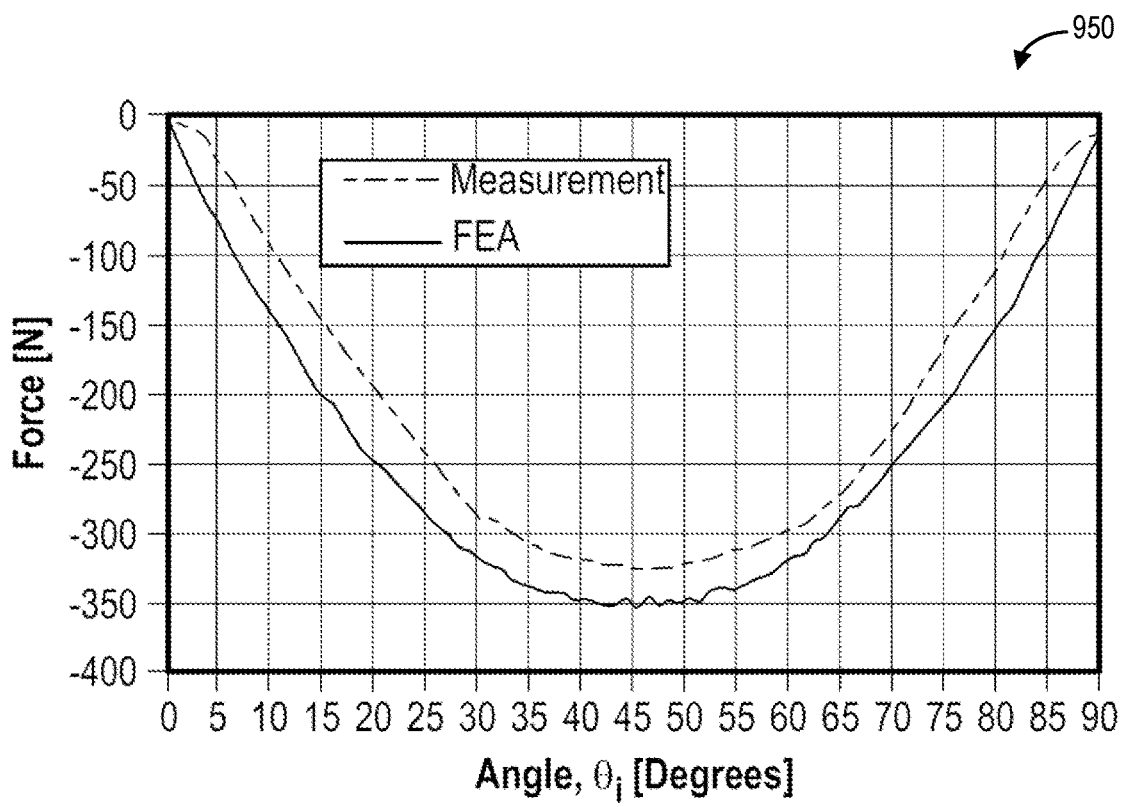
FIG. 9B shows a graph illustrating example measurements of force as a function of angle for a dual-airgap adjustable stiffness magnetic spring.

The torque and force validation was conducted using the initial proof-of-principle experimental setup 800 as shown in FIG. 8A, to test an adjustable stiffness rotary magnetic spring 805. FIG. 8B shows an assembled outer rotor 850 while FIG. 8C shows an assembled inner rotor 870 which combined form the adjustable stiffness rotary magnetic spring 805. The measured torque and force are shown in the graphs 900 and 950 of FIG. 9A and FIG. 9B, respectively. The torque and force were measured by using a Himmelstein (model 48202V) torque transducer 820 and Futek (model LCM300) force transducer 810. The stiffness was adjusted by using a mechanical turnbuckle 815 and the rotary motion was tested by using an Anaheim Automation stepper motor 825 with a 25:1 gearbox. The measured and computed torque and force were in good agreement. The percentage error in the measurements is shown in Table V.

TABLE V

Experimental Prototype

| Parameter | FEA | Measured | Units | Difference [%] |
|---|---|---|---|---|
| Peak torque | 39.1 | 37.4 | N · m | −4.3 |
| Spring rate | 49.8 | 47.6 | N · m/rad | −4.4 |
| Peak energy | 15.35 | 14.69 | J | −4.3 |
| Total mass | 1.8 | 1.8 | Kg | 0 |
| Energy density | 8.39 | 8.02 | J/kg | −4.4 |
| | 62.85 | 60.12 | kJ/m³ | −4.3 |
| Stroke length | 45° | 45° | Degrees | 0 |
| Rated angular speed | ≤50 | ≤50 | r/min | — |

Figure 10A:
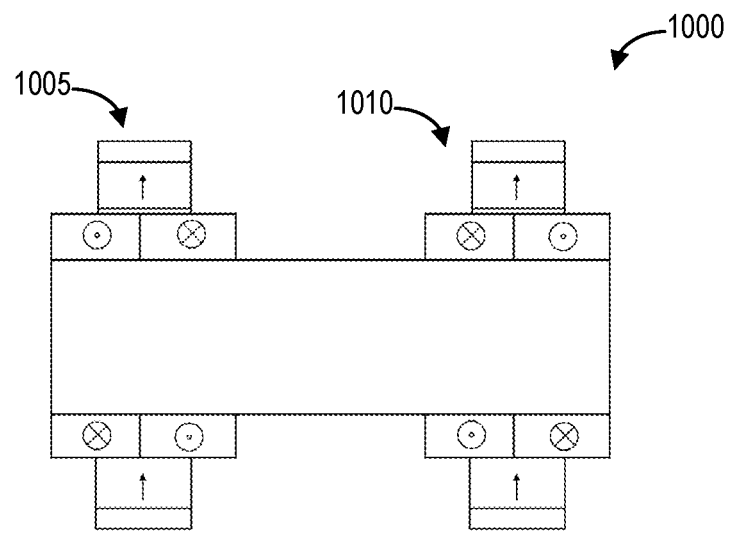
FIGS. 10A and 10B show views of an example adjustable stiffness magnetic spring with increased stroke length.
Figure 10B:
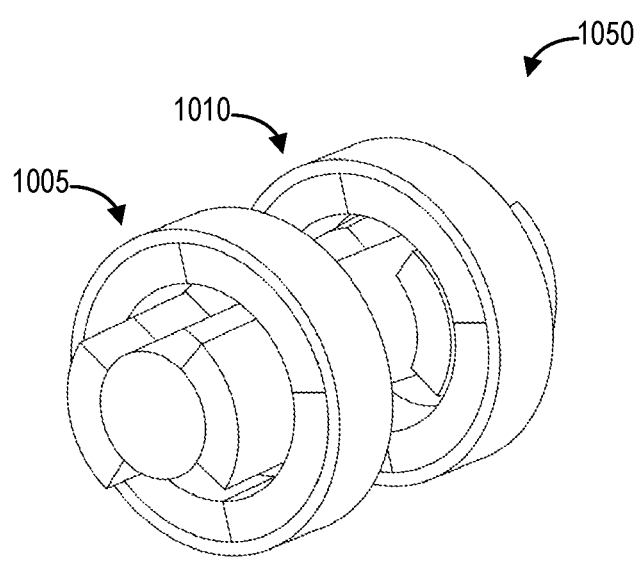
Figure 11:
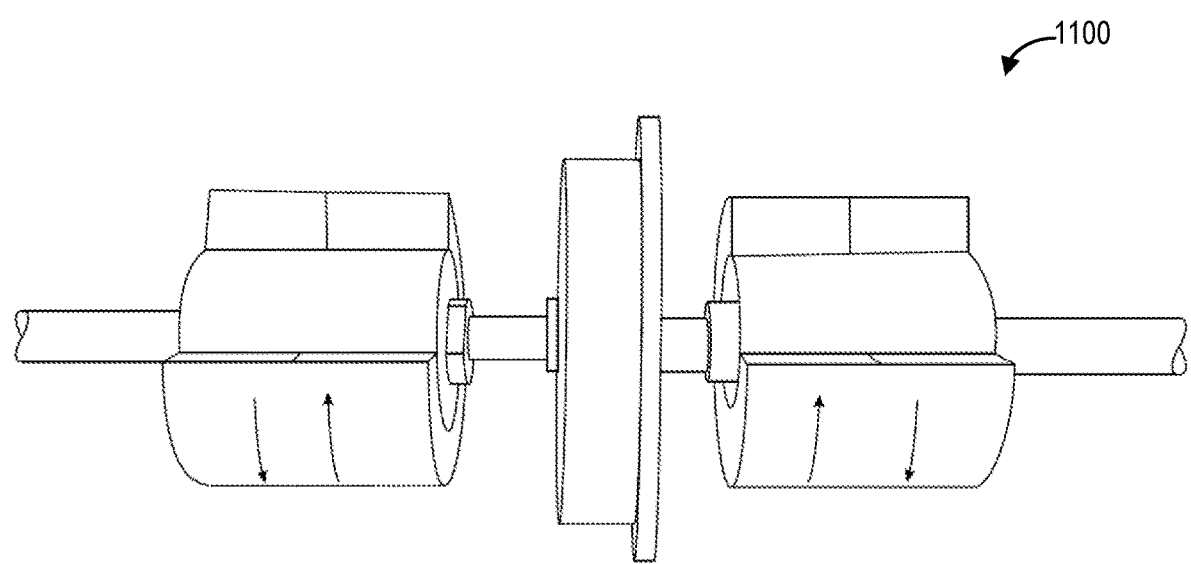
FIG. 11 shows an example assembled inner rotor for an increased-stroke-length adjustable stiffness magnetic spring.

Resonant ocean generators that use a winch type power take-off will require stroke lengths that are much greater than ±45°. As the spring stiffness is constant the springs can be connected in series to increase their stroke length. FIGS. 10A and 10B respectively show a cut-through view 1000 and a perspective view 1050 of an example ±90° series torsional spring, where a first magnetic spring 1005 and a second magnetic spring 1010 are positioned in series. FIG. 11 shows an example assembled inner rotor 1100 of such a 90° stroke length variable stiffness magnetic spring. By connecting in series, longer stroke lengths can be created. Magnetic springs in series as depicted may be used with positive stiffness springs, in some examples. Magnetic springs in series may be used with negative stiffness by using a mechanism for synchronizing the negative stiffness motion between stages.

Thus, a new type of variable stiffness rotary magnetic torsion spring is provided herein. The magnetic spring may be implemented in ocean generator applications. The proof-of-principle magnetic spring design was shown to provide a peak torque of 39.1 N·m with a ±45° angular stroke range. The spring and a high degree of linearity and the stiffness can be adjusted to provide both positive and negative stiffness values. The stroke length is further increased by using a series magnetic spring technique.

Figure 12A:
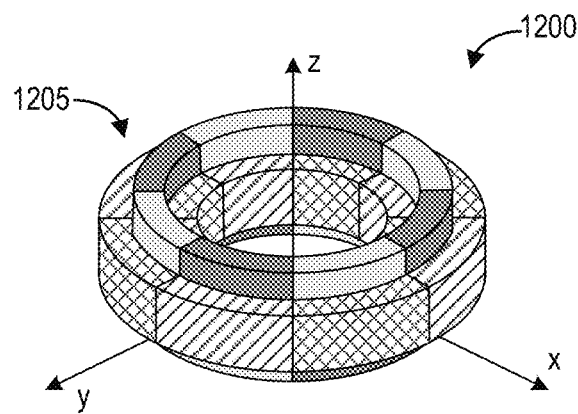
FIGS. 12A, 12B, and 12C show views of an example four-pole-pair dual-airgap coaxial adjustable stiffness magnetic spring.
Figure 12B:
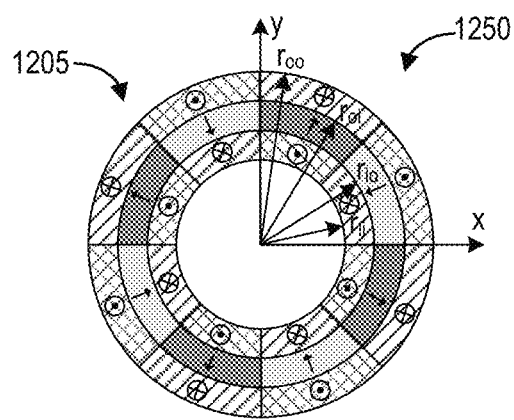
Figure 12C:
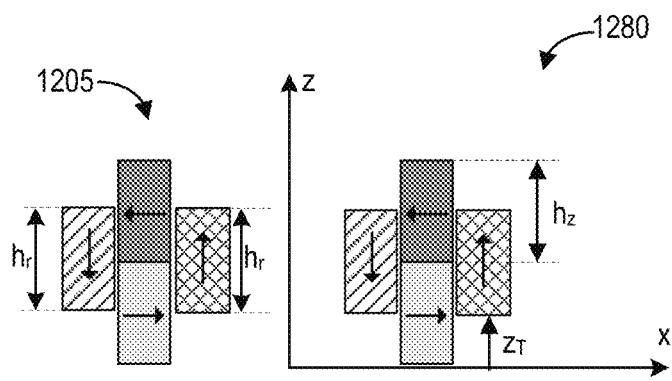
Figure 13A:
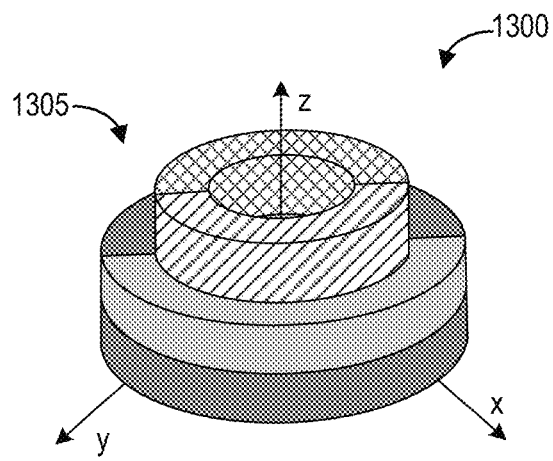
FIGS. 13A, 13B, and 13C show views of an example one-pole-pair dual-airgap coaxial adjustable stiffness magnetic spring.
Figure 13B:
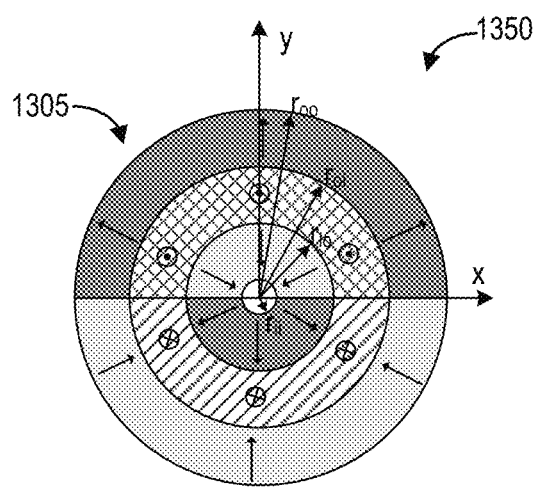
Figure 13C:
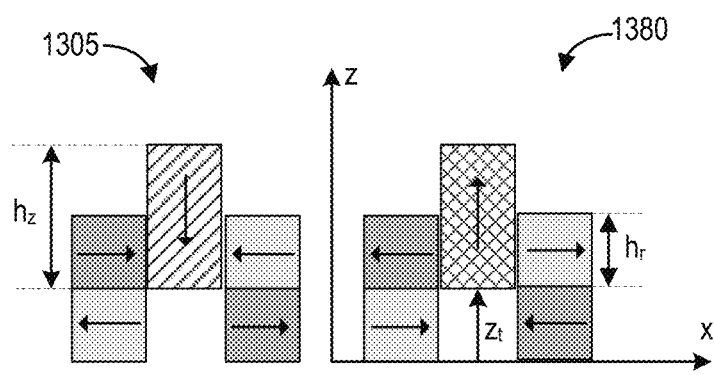

Other examples of dual-airgap adjustable stiffness magnetic springs are provided. For example, FIGS. 12A, 12B, and 12C respectively show a perspective view 1200, a plan view 1250, and a cut-through view 1280 of a four-pole-pair dual-airgap coaxial adjustable stiffness magnetic spring 1205. As another example, FIGS. 13A, 13B, and 13C respectively show a perspective view 1300, a plan view 1350, and a cut-through view 1380 of a one-pole-pair dual-airgap adjustable stiffness magnetic spring 1305. The adjustable stiffness magnetic spring linear stroke length is created via the center magnets wanting to realign with the side magnets due to the center magnet reluctance force. The four pole-pair design achieves this by making the axial magnetized magnet length $h_z$ the same length as the radial magnetized magnet length $h_r$, whereas the one pole-pair design makes the radial magnet length half the axial magnet length $h_z=2h_r$. The peak stroke length $z_m$ is determined by the height of the magnets. Due to the difference in magnet arrangement, the zero-force position for the four pole-pair design is at $z_t=h_z/2$, whereas for the one pole pair design, the zero force is at $z_t=0$.

Figure 14A:
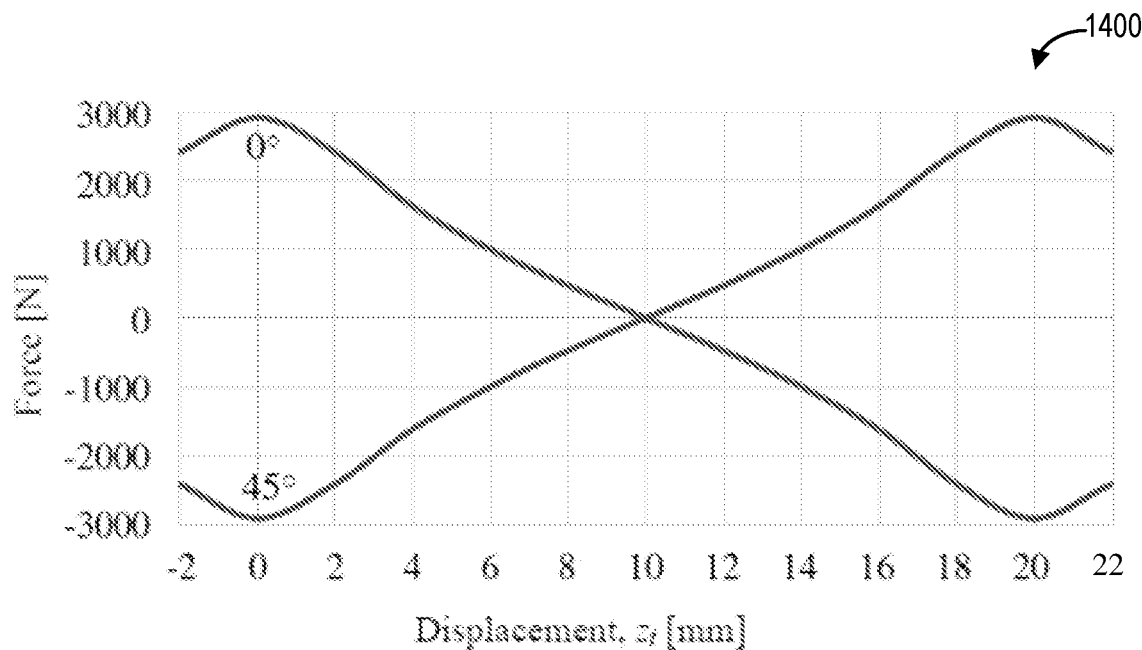
FIG. 14A shows a graph illustrating force as a function of displacement for an example four-pole-pair dual-airgap adjustable stiffness magnetic spring.
Figure 14B:
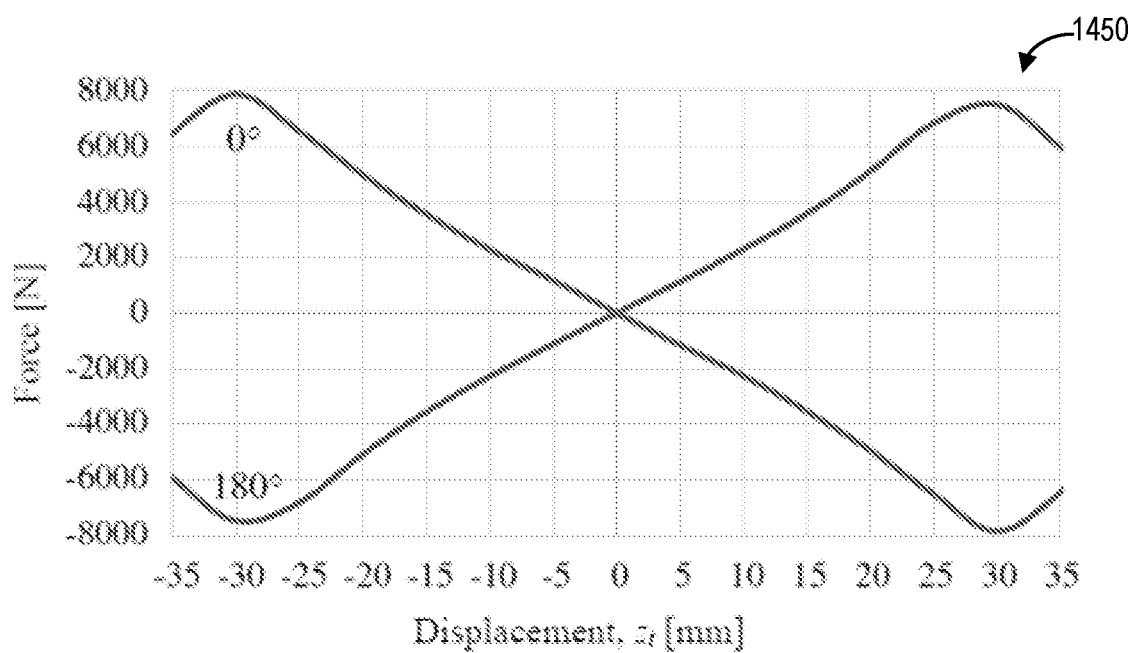
FIG. 14B shows a graph illustrating force as a function of displacement for an example one-pole-pair dual-airgap adjustable stiffness magnetic spring.

FIGS. 14A and 14B show graphs 1400 and 1450, respectively, of the force as a function of stroke length for both designs at peak positive and negative stiffness value. The parameters shown in Table VI were used. Using a lower number of pole-pairs helped to increase the stroke length but it was difficult to achieve a linear stroke length greater than 30 mm without also having very large forces and very large magnets. The linearity of the stroke length is dependent on the radial thickness of the magnets, for the longer stroke lengths the magnet thickness must be increased.

TABLE VI

Adjustable Stiffness Magnetic Spring Parameters

| | Description | Value | | | Units |
|---|---|---|---|---|---|
| | Airgap | 2 | 2 | 1 | — |
| | Pole pairs | 4 | 1 | 2 | — |
| | Stroke length | 10 | 30 | 30 | mm |
| Inner rotor | Inner radius $r_{ii}$ | 30 | 10 | 30 | mm |
| | Outer radius $r_{io}$ | 40 | 40 | 56 | mm |
| | Axial length $h_i$ | 20 | 60 | 60 | mm |
| Middle rotor | Magnet axial length $h_m$ | 40 | 60 | — | mm |
| | Airgap length g | 0.5 | 1 | 1 | mm |
| Outer Rotor | Inner radius $r_{oi}$ | 51 | 72 | 57 | mm |
| | Outer radius $r_{oo}$ | 61 | 92 | 70 | mm |
| | Magnet axial length $h_o$ | 20 | 60 | 30 | mm |
| Outer steel | Outer radius $r_{so}$ | — | — | 90 | mm |
| | Axial length $h_s$ | — | — | 60 | mm |
| Magnet grade (Nd—Fe—B) | | N50 | | | — |

Figure 15A:
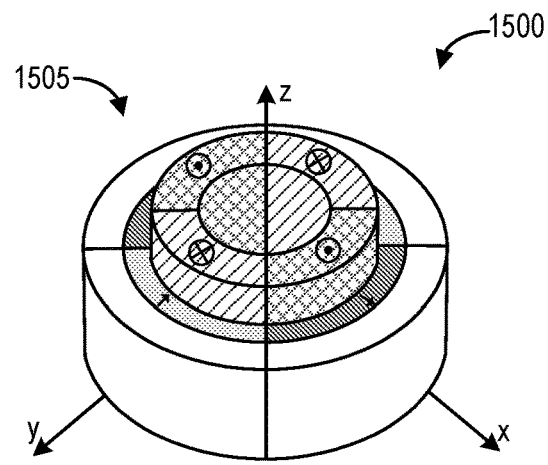
FIGS. 15A, 15B, and 15C show views of an example single-airgap adjustable stiffness magnetic spring.
Figure 15B:
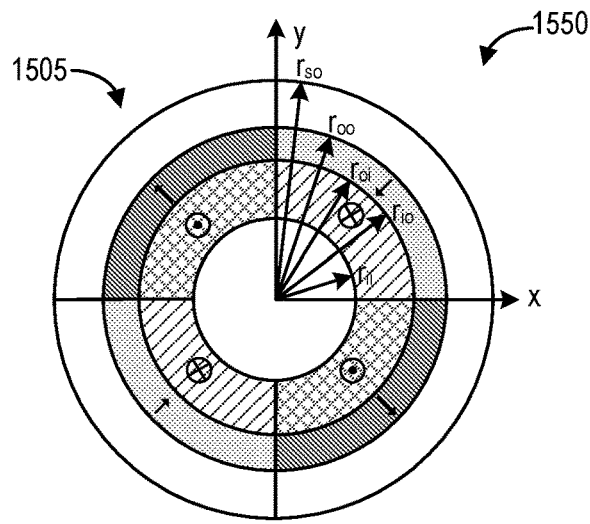
Figure 15C:
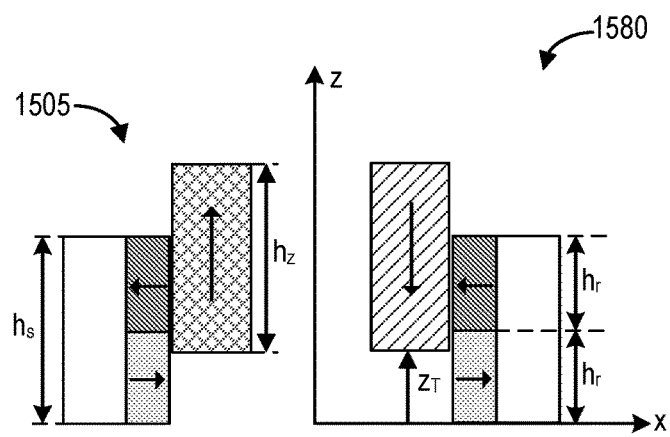

The dual-airgap spring arrangement may be mechanically difficult to build due to the need to support the central moving magnets. Thus, a single-airgap, two-pole-pair, adjustable stiffness magnetic spring with a linear stroke length is also provided herein. For example, FIGS. 15A, 15B, and 15C show a perspective view 1500, a plan x-y axis view 1550, and a cut-through view 1580 of a single-airgap adjustable stiffness magnetic spring 1505 with a multipole design. The design is significantly easier to fabricate in comparison to the double-airgap designs, as the outer rotor magnets can be affixed to a ferromagnetic outer core, while the inner rotor magnets can be supported by an inner non-magnetic core. The ferromagnetic outer cylinder provides a return flux path.

Figure 16:
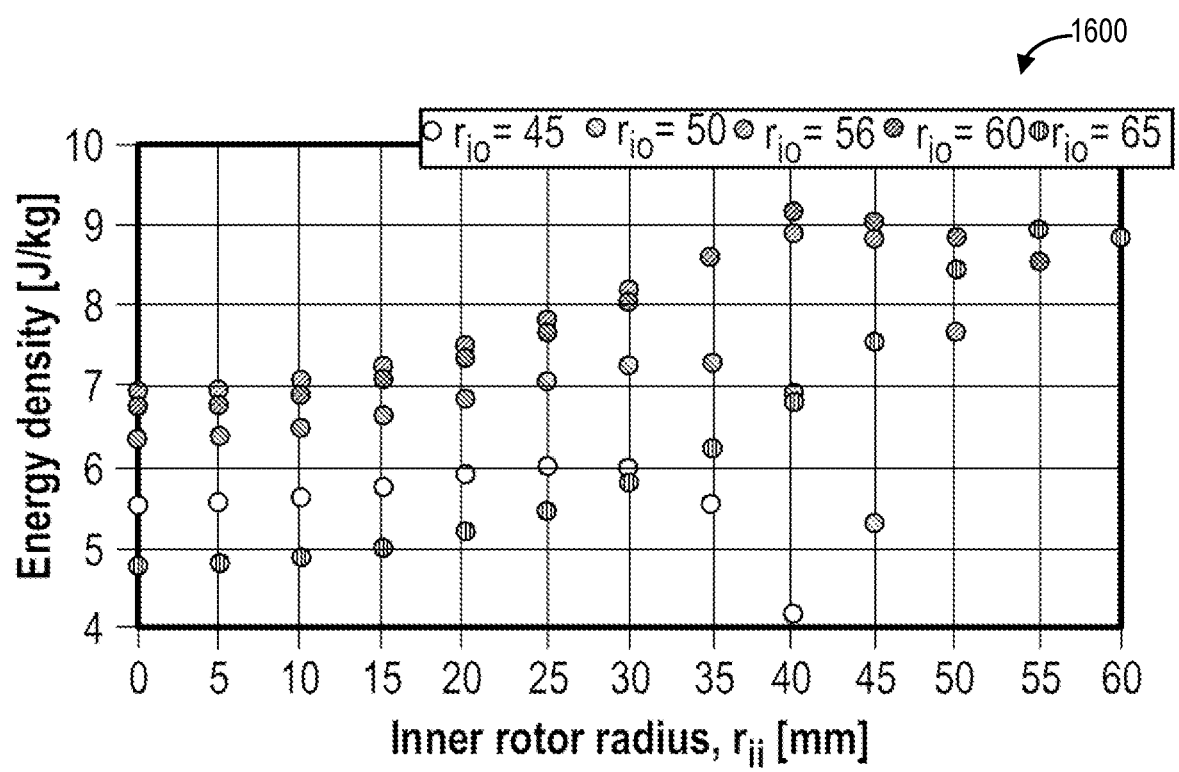
FIG. 16 shows a graph illustrating energy density as a function of inner rotor radius for a single-airgap adjustable stiffness magnetic spring.
Figure 17:
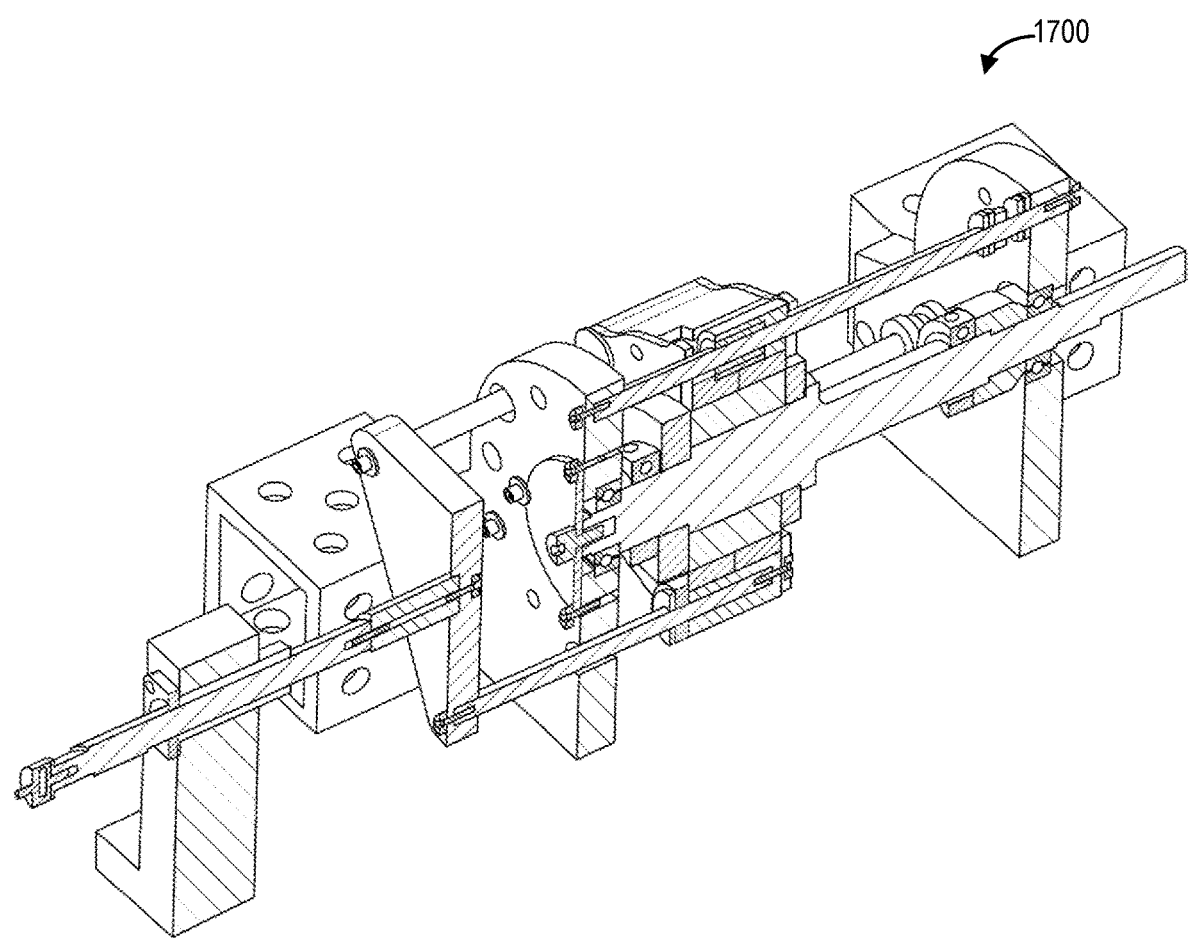
FIG. 17 shows a perspective view of an example assembled single-airgap adjustable stiffness magnetic spring.

An energy density analysis was conducted for different inner, outer and airgap radii of the single-airgap adjustable stiffness magnetic spring. The energy density was computed by using:

$$E_d = \frac{0.5 k_m \cdot z_z^2}{\rho \cdot d \left[ \pi h_i (r_{oo}^2 - r_{oi}^2) + 2\pi h_o (r_{io}^2 - r_{ii}^2) \right]}$$

where $k_m$ is the maximum stiffness value and pd=7500 kg/m$^3$ is the magnet density. To illustrate one such energy density analysis, FIG. 16 shows a graph 1600 illustrating an example energy density and inner rotor radii relationship in an FEA model where the outer radii are fixed at 70 mm. As the magnet height is related to the stroke length the magnet heights are:

$$h_r = 2h_z = z_m.$$

The inner rotor magnet radii, ($r_{ii}$, $r_{io}$), were then swept. Since the airgap, g=0.5 mm, was not changed, and $r_{oi} = r_{io} + g$, there are then only two unknown inner rotor geometric values. The energy density sweep analysis at, 5 mm step sizes, for the two inner rotor radii values is shown in the graph 1600. The peak energy density of $E_d$=9.2 J/kg occurred at ($r_{ii}$, $r_{io}$)=(40,60), as depicted. The coefficient of determination, defined as r$^2$, can be used to evaluate the level of linearity of the force. If r$^2$=1 a line is completely linear, for the peak energy density design the linearity was computed to be r$^2$=0.9837. To improve the linearity of the stroke length, the radius values ($r_{ii}$, $r_{io}$)=(30,56) were selected for the proof-of-principle prototype, using these radius values the linearity was improved r$^2$=0.9906 but the peak energy density decreased.

Based on the energy density, the parameters shown in Table VI were selected for the single-airgap adjustable stiffness magnetic spring. The resulting force and torque as a function of stroke is shown in the graphs 2000 and 2050 of FIGS. 20A and 20B respectively for the 30 mm stroke length. The force can be modelled by $$F(z_t, \theta) = -k_m [\cos(p\theta)] \cdot z_t$$

where p=2 for two pole pairs and $k_m$ is the peak stiffness value.

Figure 18:
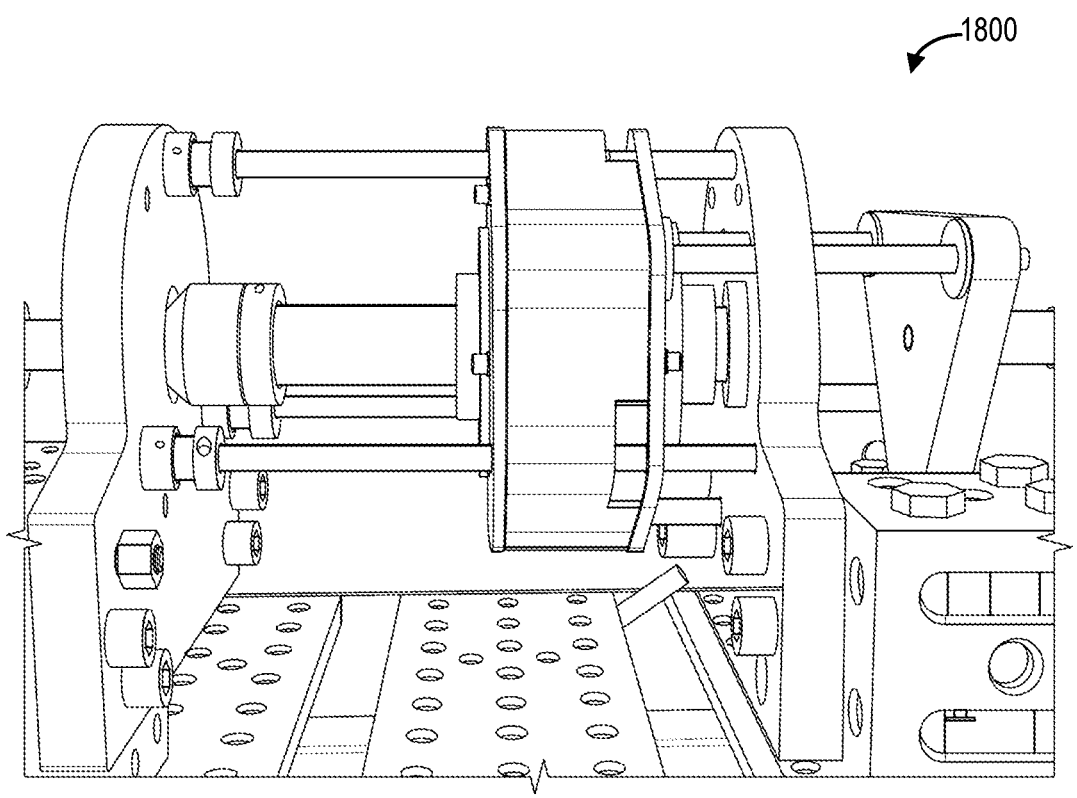
FIG. 18 shows an example assembled single-airgap adjustable stiffness magnetic spring.
Figure 19:
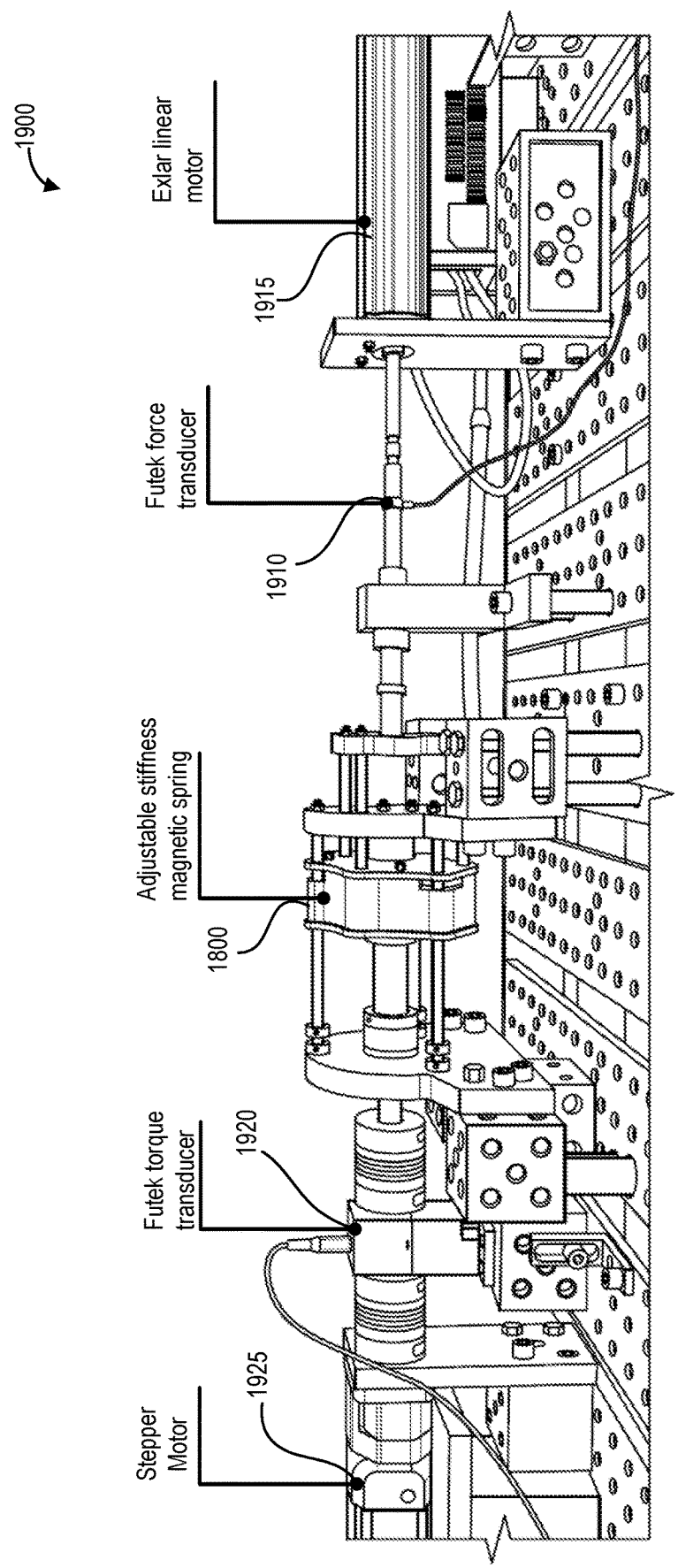
FIG. 19 shows an example system for evaluating a single-airgap adjustable stiffness magnetic spring.
Figure 20A:
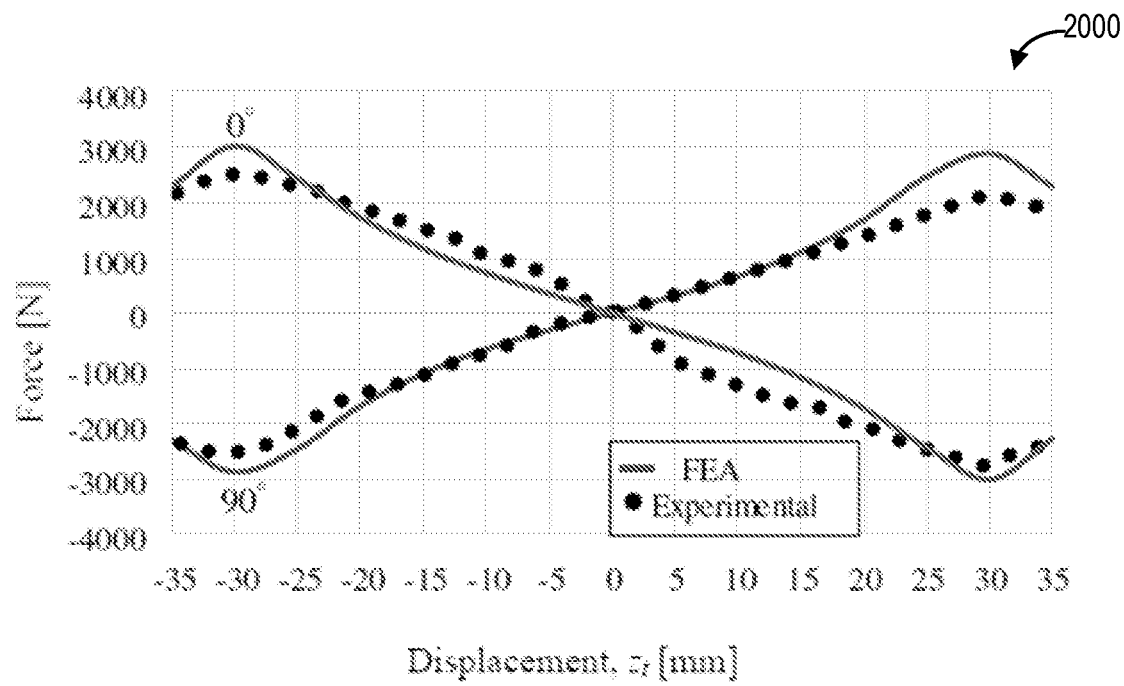
FIGS. 20A and 20B show graphs illustrating example calculations and example measurements of force as a function of displacement for a single-airgap adjustable stiffness magnetic spring.
Figure 20B:
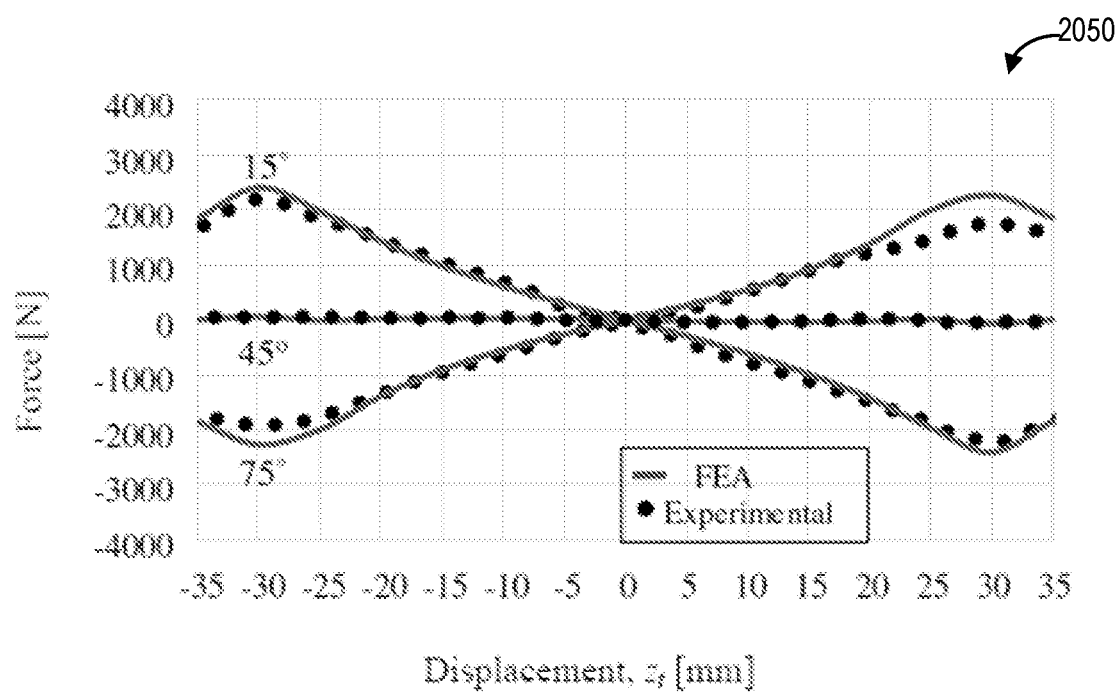
Figure 21A:
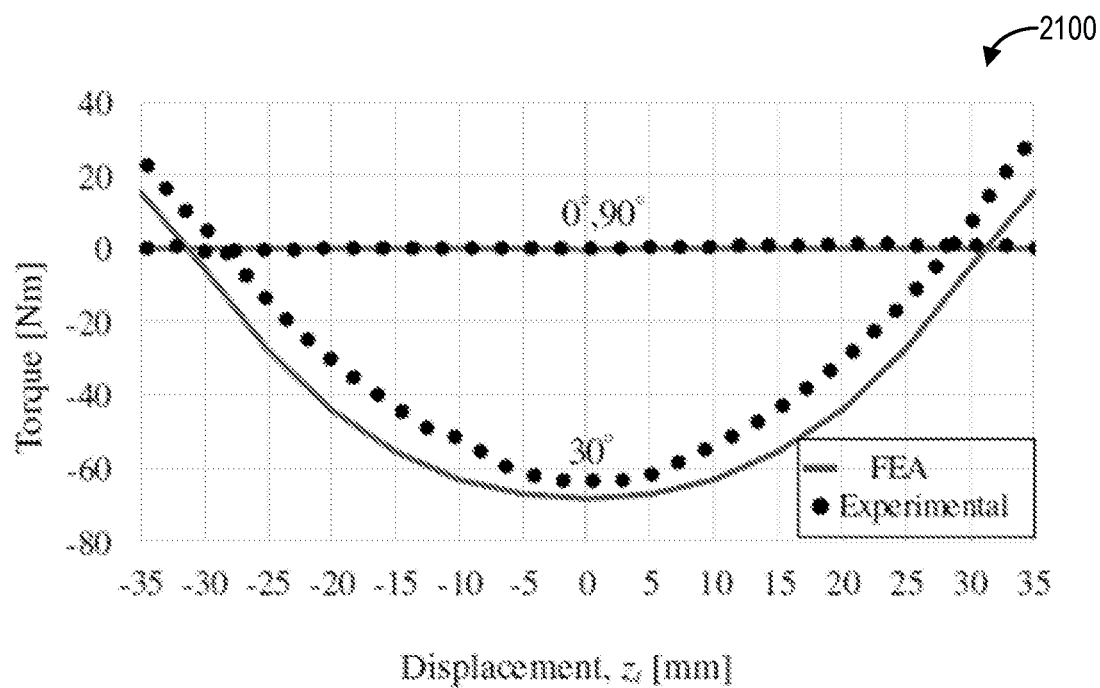
FIGS. 21A and 21B show graphs illustrating example calculations and example measurements of torque as a function of displacement for a single-airgap adjustable stiffness magnetic spring.
Figure 21B:
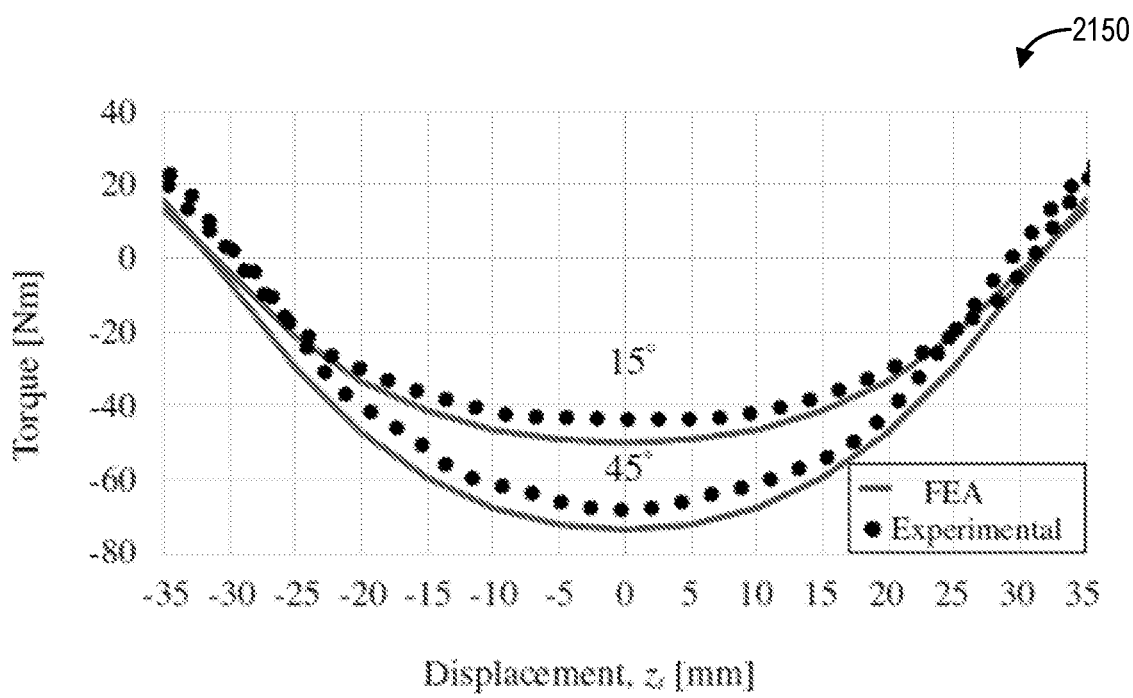

An experimental prototype of the adjustable stiffness magnetic spring was built and tested. The fully assembled adjustable stiffness magnetic spring 1800 is shown in FIG. 18 and FIG. 19 shows the adjustable stiffness magnetic spring 1800 on the test stand. For this design, the outer magnet assembly translates while the inner rotor rotates. A stepper motor 1925 with a mechanical brake was used to adjust the stiffness, for example by rotating the inner rotor. When the brake is engaged, no power is needed to hold to new stiffness value. An Exlar roller screw translator 1915 was used to create the linear motion. Using the torque transducer 1920 and force sensor 1910, the experimental results shown in FIG. 20 and FIG. 21 were obtained. Specifically, FIG. 20A and FIG. 20B show graphs 2000 and 2050, respectively, illustrating the FEA calculated values and the experimental measurements, which demonstrate a relatively good agreement between the calculations and the measurements. FIGS. 20A and 20B show graphs 2000 and 2050, respectively, illustrating force as a function of stroke length comparison between experimental and FEA values at (a) the maximum positive and negative stiffness adjusted values (0° and 90°), and (b) at angles θ of 15°, 45°, and 75°. Similarly, FIGS. 21A and 21B show graphs 2100 and 2150, respectively, illustrating torque as a function of stroke length comparison between experimental measurements and FEA values at (a) the maximum and positive negative stiffness adjusted values (0° and 90°), and (b) at angles θ of 15° and 75°. The performance is compared in Table VII. A peak force of 2.6 kN was measured with an energy density of 7.1 J/kg.

TABLE VII

| Performance Summary | | | | |
|---|---|---|---|---|
| Specification | FEA value | Measured value | % Difference | Unit |
| Peak force | 3.0 | 2.6 | −13 | kN |
| Peak torque | −73.3 | −68.1 | −7 | Nm |
| Peak stiffness $k_m$ | 100 | 86 | −13 | kN/m |
| Stroke length | 30 | 30 | 0 | Mm |
| Energy density | 8.2 | 7.1 | −13 | J/kg |
| Energy | 45 | 39 | −13 | J |

Figure 22:
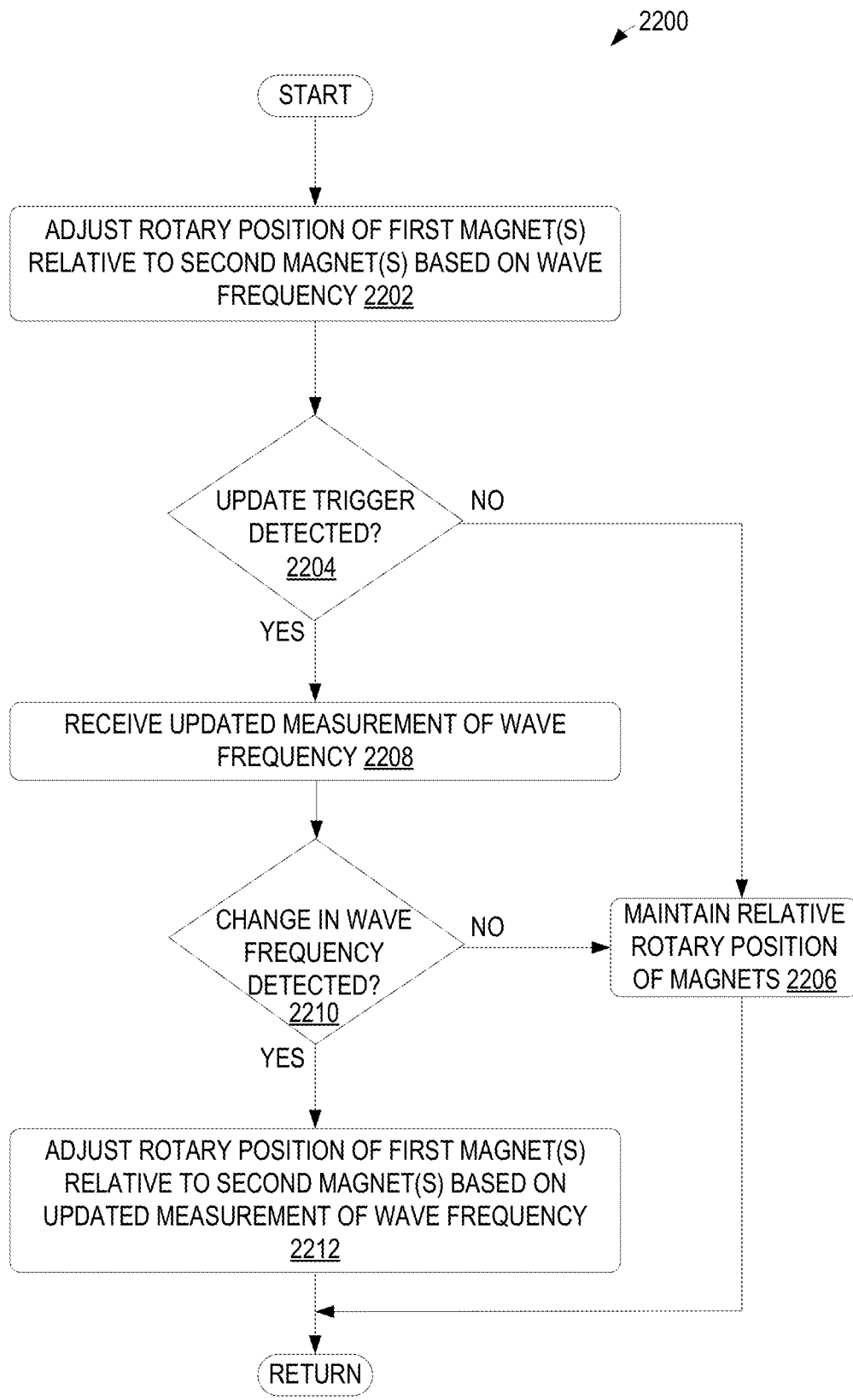
FIG. 22 shows a high-level flow chart illustrating an example method for adjusting a stiffness of an adjustable stiffness magnetic spring.

Thus, a single-airgap adjustable stiffness magnetic spring is provided. The magnetic spring exhibits a highly linear stroke length with an adjustable spring constant. Both positive and negative spring stiffness values may be achieved with equal magnitude and the stroke length exhibits a high degree of linearity. An experimental setup with a peak force capability of 2.6 kN and 30 mm stroke length was utilized to demonstrate and validate the predicted finite element analysis design results As described above, the adjustable stiffness magnetic spring examples described herein may be used in a variety of applications. FIG. 22 is a flow chart of an example method 2200 for controlling the stiffness of a magnetic spring (e.g., any of the example magnetic springs described herein) in a wave energy converter (WEC). At 2202, the method includes adjusting a rotary position of one or more first magnets relative to one or more second magnets based on a wave frequency. For example, the rotary position of the magnet(s) may be adjusted to create a negative spring constant to allow the WEC to operate at resonance with the wave frequency, as described above.

At 2204, the method includes determining if an update trigger is detected. The update trigger may be a trigger for a regular update of a measurement of wave frequency (e.g., once a minute, once an hour, once a day, etc.), a trigger based on a detected event (e.g., a weather event that indicates a likely change in wave activity, a detection of a disturbance to the water, such as increased boat traffic, that may affect wave activity, etc.), a user request, and/or any other suitable trigger. If no update trigger is detected (e.g., "NO" at 2204), the method proceeds to 2206 and includes maintaining a relative rotary position of magnets. If an update trigger is detected (e.g., "YES" at 2204), the method proceeds to 2208 and includes receiving an updated measurement of wave frequency. The updated measurement of wave frequency may be captured locally at the WEC and/or provided by a remote wave frequency detection or estimation device in some examples.

At 2210, the method includes determining if a change in wave frequency is detected. For example, the change in frequency may be detected if the updated measurement is more than a threshold amount larger or smaller than the wave frequency used to set the rotary position of the magnet(s) at 2202. If a change in wave frequency is not detected (e.g., "NO" at 2210), the method proceeds to 2206 and includes maintaining the relative rotary position of the magnets. If a change in wave frequency is detected (e.g., "YES" at 2210), the method proceeds to 2212 and includes adjusting a rotary position of the first magnet(s) relative to the second magnet(s) based on the updated measurement of wave frequency. Adjusting the rotary position may include using a motor to move the magnet and applying a brake to hold the magnet in a desired position. In examples where two rotatable magnets are included in the spring, the magnets may be rotated in coordination with one another to maintain opposite polarity in the two rotatable magnets in some examples. After adjusting the rotary position of the magnets at 2212 or maintaining the rotary position of the magnets at 2206, the method may return to continue monitoring for update triggers (e.g., return to 2204) and/or return to another state of operation.

The example operation of method 2200 may be useful in applications, such as wave energy conversion, where changing the stiffness of the magnetic spring expends some of the energy that is being converted/collected and thus reduces the efficiency of energy conversion. By only adjusting the stiffness under some conditions, less energy may be expended relative to a continuous adjustment scenario. For example, the update trigger or the threshold used to evaluate whether a substantive change in wave frequency is detected may be configured to maximize energy conversion efficiency based on the expected efficiency gain of the adjustment considering the energy usage to perform the adjustment. In other example applications, such as robotic actuation, the stiffness may be continuously adjusted based on dynamic conditions in order to provide an increased responsiveness of the spring (e.g., a reduction in delay between a requested actuation or detected condition and an associated affected actuation).

Figure 23:
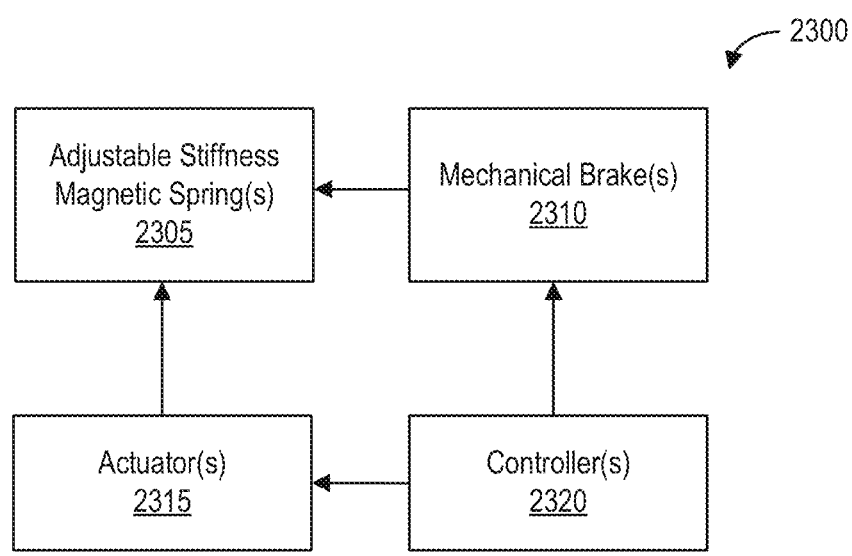
FIG. 23 shows a block diagram illustrating an example system for adjusting and maintaining stiffness of an adjustable stiffness magnetic spring.

FIG. 23 shows a block diagram illustrating an example system 2300 for implementing one or more adjustable stiffness magnetic spring(s) 2305. In some examples, the one or more adjustable stiffness magnetic spring(s) 2305 may comprise a single adjustable stiffness magnetic spring, such as one of the designs described hereinabove (e.g., a dual airgap or single airgap adjustable stiffness magnetic spring). In other examples, the one or more adjustable stiffness magnetic spring(s) 2305 may comprise two or more adjustable stiffness magnetic springs positioned in series to achieve an increased stroke length. One or more mechanical brake(s) 2310 may be applied to the adjustable stiffness magnetic spring(s) 2305 to maintain a stiffness of the adjustable stiffness magnetic spring(s) 2305. Additionally, the system 2300 may include one or more actuator(s) 2315 configured to adjust the relative angular and/or axial positions of the magnets forming the adjustable stiffness magnetic spring(s) 2305, for example by rotating and/or axially translating the rotors relative to each other. Further, the system 2300 may include one or more controller(s) 2320 comprising a processor and non-transitory memory, as an illustrative example, with instructions stored thereon that when executed by the processor cause the controller(s) 2320 to control the mechanical brake(s) 2310 to brake the motion of the adjustable stiffness magnetic spring(s) 2305, for example, and/or to control the actuator(s) 2315 to otherwise actuate the adjustable stiffness magnetic spring(s) 2305.

Thus, various embodiments of a variable stiffness magnetic spring are provided, along with various systems and methods for such variable stiffness magnetic springs. In one example, a variable stiffness magnetic spring comprises a first cylindrical magnetic component, and a second cylindrical magnetic component, wherein the first cylindrical magnetic component is coaxial with the second cylindrical magnetic component, wherein the first cylindrical magnetic component is rotatable about an axis and relative to the second cylindrical magnetic component to adjust a stiffness of the variable stiffness magnetic spring, and wherein the second cylindrical magnetic component is translatable along the axis and relative to the first cylindrical magnetic component. In a first example of the variable stiffness magnetic spring, a polarity of the first cylindrical magnetic component is orthogonal to a polarity of the second cylindrical magnetic component. In a second example of the variable stiffness magnetic spring optionally including the first example, the first cylindrical magnetic component comprises at least a first magnet and a second magnet, wherein a polarity of the first magnet is in an opposing direction to a polarity of the second magnet. In a third example of the variable stiffness magnetic spring optionally including one or more of the first and second examples, the polarity of the first magnet and the polarity of the second magnet are parallel to the axis. In a fourth example of the variable stiffness magnetic spring optionally including one or more of the first and second examples, the polarity of the first magnet and the polarity of the second magnet are orthogonal to the axis. In a fifth example of the variable stiffness magnetic spring optionally including one or more of the first through fourth examples, the variable stiffness magnetic spring further comprises a third cylindrical magnetic component coaxial with the first cylindrical magnetic component and the second cylindrical magnetic component. In a sixth example of the variable stiffness magnetic spring optionally including one or more of the first through fifth examples, the first cylindrical magnetic component, the second cylindrical magnetic component, and the third cylindrical magnetic component comprise four-pole-pair magnets. In a seventh example of the variable stiffness magnetic spring optionally including one or more of the first through sixth examples, the first cylindrical magnetic component, the second cylindrical magnetic component, and the third cylindrical magnetic component comprise one-pole-pair magnets. In an eighth example of the variable stiffness magnetic spring optionally including one or more of the first through seventh examples, the first cylindrical magnetic component and the second cylindrical magnetic component comprise two-pole-pair magnets. In a ninth example of the variable stiffness magnetic spring optionally including one or more of the first through eighth examples, the variable stiffness magnetic spring further comprises a ferromagnetic cylinder coaxial with the first cylindrical magnetic component and the second cylindrical magnetic component.

In another example, a system comprises a variable stiffness magnetic spring comprising an inner cylindrical magnetic component and an outer cylindrical magnetic component, wherein the inner cylindrical magnetic component is coaxial with the outer cylindrical magnetic component, the inner cylindrical magnetic component is rotatable about an axis and relative to the outer cylindrical magnetic component to adjust a stiffness of the variable stiffness magnetic spring, and the outer cylindrical magnetic component is translatable along the axis and relative to the inner cylindrical magnetic component. The system further comprises a mechanical brake configured to lock one or more of an angular position of the inner cylindrical magnetic component and an axial position of the outer cylindrical magnetic component. In a first example of the system, a polarity of the inner cylindrical magnetic component is orthogonal to a polarity of the outer cylindrical magnetic component. In a second example of the system optionally including the first example, the inner cylindrical magnetic component comprises at least a first magnet and a second magnet, wherein a polarity of the first magnet is in an opposing direction to a polarity of the second magnet. In a third example of the system optionally including one or more of the first and second examples, the polarity of the first magnet and the polarity of the second magnet are parallel to the axis. In a fourth example of the system optionally including one or more of the first through third examples, the polarity of the first magnet and the polarity of the second magnet are orthogonal to the axis. In a fifth example of the system optionally including one or more of the first through fourth examples, the system further comprises a third cylindrical magnetic component coaxial with the inner cylindrical magnetic component and the outer cylindrical magnetic component, wherein a radius of the third cylindrical magnetic component is greater than a radius of the outer cylindrical magnetic component. In a sixth example of the system optionally including one or more of the first through fifth examples, a polarity of the inner cylindrical magnetic component is orthogonal to a polarity of the outer cylindrical magnetic component, and a polarity of the third cylindrical magnetic component is orthogonal to the polarity of the outer cylindrical magnetic component. In a seventh example of the system optionally including one or more of the first through sixth examples, the system further comprises a second variable stiffness magnetic spring positioned in series with the variable stiffness magnetic spring.

In yet another example, a method of adjusting a stiffness of a magnetic spring comprises adjusting a rotary position of a first magnet relative to a second magnet, controlling a mechanical brake to lock the rotary position of the first magnet, detecting an update trigger, receiving an updated condition, controlling the mechanical brake to unlock the rotary position of the first magnet, and adjusting the rotary position of the first magnet relative to the second magnet based on the updated condition. In an example of the method, the magnetic spring is included in a wave energy converter and the updated condition includes a wave frequency.

All aspects, characteristics, properties, and other features described in conjunction with a particular aspect, embodiment, or example of the disclosed technology are to be understood to be applicable to any other aspect, embodiment, or example described in this application unless incompatible therewith. All of the features disclosed in this specification and the accompanying documents filed herewith and incorporated by reference may be combined in any combination, except combinations where at least some of such features and/or steps are mutually exclusive. The invention(s) is not restricted to the details of any particular embodiments. The invention(s) extends to any novel one, or any novel combination, of the features disclosed in this application, or to any novel one, or any novel combination, of the steps of any method or process so disclosed.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A variable stiffness magnetic spring, comprising:
   a first cylindrical magnetic component;
   a second cylindrical magnetic component; and
   a third cylindrical magnetic component,
   wherein the first cylindrical magnetic component is coaxial with the second cylindrical magnetic component, wherein the third cylindrical magnetic component is coaxial with the first cylindrical magnetic component and the second cylindrical magnetic component, wherein the first cylindrical magnetic component is rotatable about an axis and relative to the second cylindrical magnetic component to adjust a stiffness of the variable stiffness magnetic spring, and wherein the second cylindrical magnetic component is translatable along the axis and relative to the first cylindrical magnetic component.

2. The variable stiffness magnetic spring of claim 1, wherein the first cylindrical magnetic component comprises at least a first magnet and a second magnet, wherein a polarity of the first magnet is in an opposing direction to a polarity of the second magnet.

3. The variable stiffness magnetic spring of claim 2, wherein the polarity of the first magnet and the polarity of the second magnet are parallel to the axis.

4. The variable stiffness magnetic spring of claim 2, wherein the polarity of the first magnet and the polarity of the second magnet are orthogonal to the axis.

5. The variable stiffness magnetic spring of claim 1, wherein the first cylindrical magnetic component and the second cylindrical magnetic component comprise two-pole-pair magnets.

6. The variable stiffness magnetic spring of claim 5, wherein the third cylindrical magnetic component comprises a ferromagnetic cylinder.

7. The variable stiffness magnetic spring of claim 1, wherein the first cylindrical magnetic component, the second cylindrical magnetic component, and the third cylindrical magnetic component comprise four-pole-pair magnets.

8. The variable stiffness magnetic spring of claim 1, wherein the first cylindrical magnetic component, the second cylindrical magnetic component, and the third cylindrical magnetic component comprise one-pole-pair magnets.

9. The variable stiffness magnetic spring of claim 1, wherein a polarity of the first cylindrical magnetic component is orthogonal to a polarity of the second cylindrical magnetic component.

10. A system, comprising:
    a variable stiffness magnetic spring comprising an inner cylindrical magnetic component, an outer cylindrical magnetic component, and a third cylindrical magnetic component, wherein the inner cylindrical magnetic component is coaxial with the outer cylindrical magnetic component, the third cylindrical magnetic is coaxial with the inner cylindrical magnetic component and the outer cylindrical magnetic component, a radius of the third cylindrical magnetic component is greater than a radius of the outer cylindrical magnetic component, the inner cylindrical magnetic component is rotatable about an axis and relative to the outer cylindrical magnetic component to adjust a stiffness of the variable stiffness magnetic spring, and the outer cylindrical magnetic component is translatable along the axis and relative to the inner cylindrical magnetic component; and
    a mechanical brake configured to lock one or more of an angular position of the inner cylindrical magnetic component and an axial position of the outer cylindrical magnetic component.

11. The system of claim 10, wherein the inner cylindrical magnetic component comprises at least a first magnet and a second magnet, wherein a polarity of the first magnet is in an opposing direction to a polarity of the second magnet.

12. The system of claim 11, wherein the polarity of the first magnet and the polarity of the second magnet are parallel to the axis.

13. The system of claim 11, wherein the polarity of the first magnet and the polarity of the second magnet are orthogonal to the axis.

14. The system of claim 10, wherein a polarity of the inner cylindrical magnetic component is orthogonal to a polarity of the outer cylindrical magnetic component.

15. The system of claim 11, wherein a polarity of the inner cylindrical magnetic component is orthogonal to a polarity of the outer cylindrical magnetic component, and wherein a polarity of the third cylindrical magnetic component is orthogonal to the polarity of the outer cylindrical magnetic component.

16. The system of claim 10, further comprising a second variable stiffness magnetic spring positioned in series with the variable stiffness magnetic spring.

17. A method of adjusting a stiffness of a magnetic spring, comprising:
- adjusting a rotary position of a first magnet relative to a second magnet;
- controlling a mechanical brake to lock the rotary position of the first magnet;
- detecting an update trigger;
- receiving an updated condition;
- controlling the mechanical brake to unlock the rotary position of the first magnet; and
- adjusting the rotary position of the first magnet relative to the second magnet based on the updated condition.

18. The method of claim 17, wherein the magnetic spring is included in a wave energy converter and wherein the updated condition includes a wave frequency.

* * * * *